US012777460B2

(12) United States Patent
Alasti et al.

(10) Patent No.: US 12,777,460 B2
(45) Date of Patent: Oct. 27, 2026

(54) INTELLIGENT PAGING FOR USER EQUIPMENT DEVICES

(71) Applicant: Boost SubscriberCo L.L.C., Englewood, CO (US)

(72) Inventors: Mehdi Alasti, Arlington, VA (US); William Beckwith, Vienna, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 311 days.

(21) Appl. No.: 18/442,696

(22) Filed: Feb. 15, 2024

(65) Prior Publication Data

US 2025/0267626 A1 Aug. 21, 2025

(51) Int. Cl.
*H04W 68/02* (2009.01)
*H04W 12/80* (2021.01)
*H04W 76/20* (2018.01)

(52) U.S. Cl.
CPC .......... *H04W 68/02* (2013.01); *H04W 12/80* (2021.01); *H04W 76/20* (2018.02)

(58) Field of Classification Search
CPC ......... H04W 8/02; H04W 8/06; H04W 4/029; H04W 36/322; H04W 4/02; H04W 68/02; H04W 76/20; H04W 12/80; H04W 76/27
See application file for complete search history.

(56) References Cited

U.S. PATENT DOCUMENTS

2010/0220680 A1* 9/2010 Ramankutty ......... H04W 68/08 370/329
2011/0069664 A1* 3/2011 Yin ...................... H04W 60/00 370/328
2011/0096669 A1* 4/2011 Lovieno .................. H04W 8/02 370/328
2011/0287785 A1* 11/2011 Hu ......................... H04W 8/08 455/456.2
2014/0155109 A1* 6/2014 Vaidya .................. H04W 68/04 455/458
2016/0072850 A1* 3/2016 Zhang .................. H04L 63/306 726/12
2016/0112847 A1* 4/2016 Hyytiainen ........... H04W 68/00 455/458

(Continued)

FOREIGN PATENT DOCUMENTS

CA 3132854 A1 * 9/2020 ............ H04W 76/10
EP 3346735 A1 * 7/2018 .......... H04W 68/005

OTHER PUBLICATIONS

3GPP Technical Specification 29.518 version 18.4.0 available at https://portal.3gpp.org/desktopmodules/Specifications/SpecificationDetails.aspx?specificationId=3339 (Jan. 2, 2024).

(Continued)

*Primary Examiner* — Dung Hong
(74) *Attorney, Agent, or Firm* — Kilpatrick Townsend & Stockton LLP

(57) ABSTRACT

Intelligent paging for User Equipment (UE) devices in idle mode or inactive mode is disclosed. A UE device that is in idle or inactive mode may be temporarily brought into active mode to acquire its location using intelligent paging. This allows the requesting entity to track the UE device. The location of UE devices may be tracked at the Cell-ID level or at a more accurate level, such as with latitude, longitude, and/or altitude.

20 Claims, 13 Drawing Sheets

(56) References Cited

U.S. PATENT DOCUMENTS

| | | | | |
|---|---|---|---|---|
| 2016/0174285 | A1* | 6/2016 | Ke | H04W 8/02 370/329 |
| 2016/0344774 | A1* | 11/2016 | Westberg | H04L 63/306 |
| 2017/0163727 | A1* | 6/2017 | Dolby | H04L 67/1095 |
| 2019/0037383 | A1* | 1/2019 | Yang | H04W 8/18 |
| 2020/0396591 | A1* | 12/2020 | Ou | H04W 76/30 |
| 2021/0144184 | A1* | 5/2021 | Wong | H04L 65/1069 |
| 2023/0007052 | A1* | 1/2023 | Attanasio | H04L 63/30 |
| 2023/0216951 | A1* | 7/2023 | Giorgio Gaggia | H04L 63/302 379/37 |
| 2023/0224337 | A1* | 7/2023 | Gaito | H04L 41/0806 |
| 2023/0269278 | A1* | 8/2023 | Saghir | H04W 12/80 726/1 |
| 2024/0214430 | A1* | 6/2024 | Gaito | H04L 63/30 |
| 2024/0380792 | A1* | 11/2024 | Gaito | H04L 63/306 |
| 2024/0381098 | A1* | 11/2024 | Celozzi | H04W 12/80 |
| 2025/0031051 | A1* | 1/2025 | Gaito | H04W 76/14 |
| 2025/0193683 | A1* | 6/2025 | Celozzi | H04W 12/80 |
| 2025/0211961 | A1* | 6/2025 | Attanasio | H04L 63/302 |
| 2025/0247709 | A1* | 7/2025 | Yuan | H04L 9/40 |
| 2025/0267626 | A1* | 8/2025 | Alasti | H04W 12/80 |
| 2025/0386199 | A1* | 12/2025 | Attanasio | H04W 12/80 |

OTHER PUBLICATIONS

3GPP TS 29.572 version 18.4.0 available at https://portal.3gpp.org/desktopmodules/Specifications/SpecificationDetails.aspx?specificationld=3407 (Jan. 2, 2024).

* cited by examiner

INTELLIGENT PAGING FOR USER EQUIPMENT DEVICES

FIELD

The present invention generally relates to communications, and more specifically, to intelligent paging for User Equipment (UE) devices.

BACKGROUND

Wireless telecommunications networks support various positioning techniques to track the location of a UE device. These techniques support different levels of accuracy. The level of accuracy that is provided by the carrier may be at the cell site level (i.e., providing the Cell Identifier (Cell-ID), which is included in the cellIdentifier field in System Information Block 1 (SIB1) and transmitted using the Broadcast Control Channel (BCCH) in Fifth Generation (5G) networks) or a higher accuracy, such as providing positioning with altitude, longitude, and/or altitude.

The Administrative Function (ADMF) uses the standard Third Generation Partnership Project (3GPP) methodology of performing a location query of a UE device by the ADMF from the Access and Mobility Management Function (AMF). Fourth Generation (4G) and 5G networks support active and idle modes for User Equipment (UE) devices, and 5G further supports an inactive mode. The wireless network can provide the location of a target UE device when it is operating in active mode. However, when the UE device is in idle mode, the AMF can only provide the last known Cell-ID and not the serving Cell-ID. Also, while the UE device is in inactive mode, the 5G core network believes that the UE device is in active mode, but the UE device may have moved into a different cell in a cluster of cells, so the AMF does not necessarily provide the Cell-ID of the cell that the UE device is actually in. Accordingly, an improved and/or alternative approach may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to intelligent paging for UE devices.

In an embodiment, one or more non-transitory computer-readable media store one or more computer programs for performing intelligent paging for UE devices in idle mode. The one or more computer programs are configured to cause at least one processor to send a tracking request to a Network Function (NF) that manages access and mobility for UE devices, by an NF that facilitates Lawful Intercept (LI). The one or more computer programs are also configured to cause the at least one processor to, responsive to receiving the tracking request, determine a Tracking Area in which a UE device is registered, by the NF that manages access and mobility for the UE devices. The one or more computer programs are further configured to cause the at least one processor to page cell sites of the Tracking Area to cause the UE device to transition from idle mode to active mode and obtain a Cell-ID of a current cell that the UE device is in, by the NF that manages access and mobility for the UE devices. Additionally, the one or more computer programs are also configured to cause the at least one processor to provide the obtained Cell-ID to the NF that facilitates LI, by the NF that manages access and mobility for the UE devices. The page for the UE device is sent without subsequently sending additional data pertaining to voice, text message, or data services for the UE device itself.

In another embodiment, one or more computing systems include memory storing computer program instructions for performing intelligent paging for UE devices in idle mode and at least one processor configured to execute the computer program instructions. The computer program instructions are configured to cause the at least one processor to determine a Tracking Area in which a UE device is registered, by an NF that manages access and mobility for UE devices. The computer program instructions are also configured to cause the at least one processor to page cell sites of the Tracking Area to cause the UE device to transition from idle mode to active mode and obtain a Cell-ID of a current cell that the UE device is in, by the NF that manages access and mobility for the UE devices. The computer program instructions are further configured to cause the at least one processor to provide the obtained Cell-ID to an NF that facilitates LI, by the NF that manages access and mobility for the UE devices. The page for the UE device is sent without subsequently sending additional data pertaining to voice, text message, or data services for the UE device itself. The transition of the UE device to active mode is performed without providing an indication to a user of the UE device that the transition occurred.

In yet another embodiment, a computer-implemented method for performing intelligent paging for UE devices in idle mode includes querying a NF that performs data management for a telecommunications network for an identifier of an NF that manages access and mobility for UE devices for a UE device, by an NF that facilitates LI. The computer-implemented method also includes receiving the identifier of the NF that manages access and mobility for the UE devices from the NF that performs data management for the telecommunications network and sending a tracking request to the NF that manages access and mobility for the UE devices associated with the identifier, by the NF that facilitates LI. The computer-implemented method further includes, responsive to receiving the tracking request from the NF that facilitates LI, determining a Tracking Area in which a UE device is registered, by the NF that manages access and mobility for the UE devices. Additionally, the computer-implemented method includes paging cell sites of the Tracking Area to cause the UE device to transition from idle mode to active mode and obtaining a Cell-ID of a current cell that the UE device is in, by the NF that manages access and mobility for the UE devices. The computer-implemented method also includes providing the obtained Cell-ID to the NF that facilitates LI, by the NF that manages access and mobility for the UE devices. The page for the UE device is sent without subsequently sending additional data pertaining to voice, text message, or data services for the UE device itself.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments pertain to intelligent paging for UE devices. Network Provided Location Information (NPLI) is used to provide the accurate location of a UE device even when the device is in idle or inactive mode. A UE device that is in idle or inactive mode is temporarily brought into active mode to acquire its current Cell-ID and/or a more accurate location using intelligent paging. As used herein, “intelligent paging” refers to paging the UE device without subsequently providing additional data pertaining to a call, a text message, data for a mobile phone application such as a web browser or over-the-top (OTT) application, etc. This paging allows the requesting entity to track the UE device. In other words, once in active mode, accurate positioning of UE devices is supported by the network and acquired.

To obtain location information in idle mode, the AMF pages the UE device in a Tracking Area. However, while 3GPP 5G Rel-17 and beyond supports acquiring the location of a UE device while inactive, 3GPP 5G Rel-15 and Rel-16 do not. Accordingly, some embodiments may cause UE devices to transition from an inactive state to an active state for Rel-15 and Rel-16, and any other releases that do not support positioning in inactive mode by paging the cluster for the UE device by the Radio Access Network (RAN).

The location of UE devices may be tracked with various levels of accuracy. In other words, the location of the UE device may be at the Cell-ID level (i.e., the identifier of the cell site) or known more accurately. For instance, positioning with latitude, longitude, and/or altitude may be determined using New Radio (NR) Enhanced Cell-ID (E-CID), Downlink (DL) Time Difference of Arrival (TDoA), Uplink (UL) TDoA, Multi-Cell Round Trip Time (MC-RTT), UL Angle of Arrival (AoA), DL Angle of Departure (AoD), etc. These techniques provide the location with different levels of certainty.

Per the above, 4G and 5G networks support active and idle modes for UE devices, and 5G further supports an inactive mode. This inactive mode does not exist in 4G. In 5G, the active, idle, and inactive modes are called Radio Resource Control (RRC) Connected, RRC Idle, and RRC Inactive, respectively.

In 5G, the RRC control plane protocol stack is used for signaling between a UE device and a base station (i.e., a Next Generation Node B (gNB)). In other words, the RRC control plane protocol stack is fully contained within the RAN. RRC messages are transferred using a set of Signaling Radio Bearers (SRBs). Some example RRC signaling procedures include paging, RRC connection establishment, RRC connection reconfiguration, and RRC connection release. The Master Information Block (MIB) and SIB1 are known as “Minimum System Information” because they provide the basic parameter set required for initial access and acquiring any other system information. The MIB contains the information that allows the UE device to subsequently receive SIB1.

Figure 1:
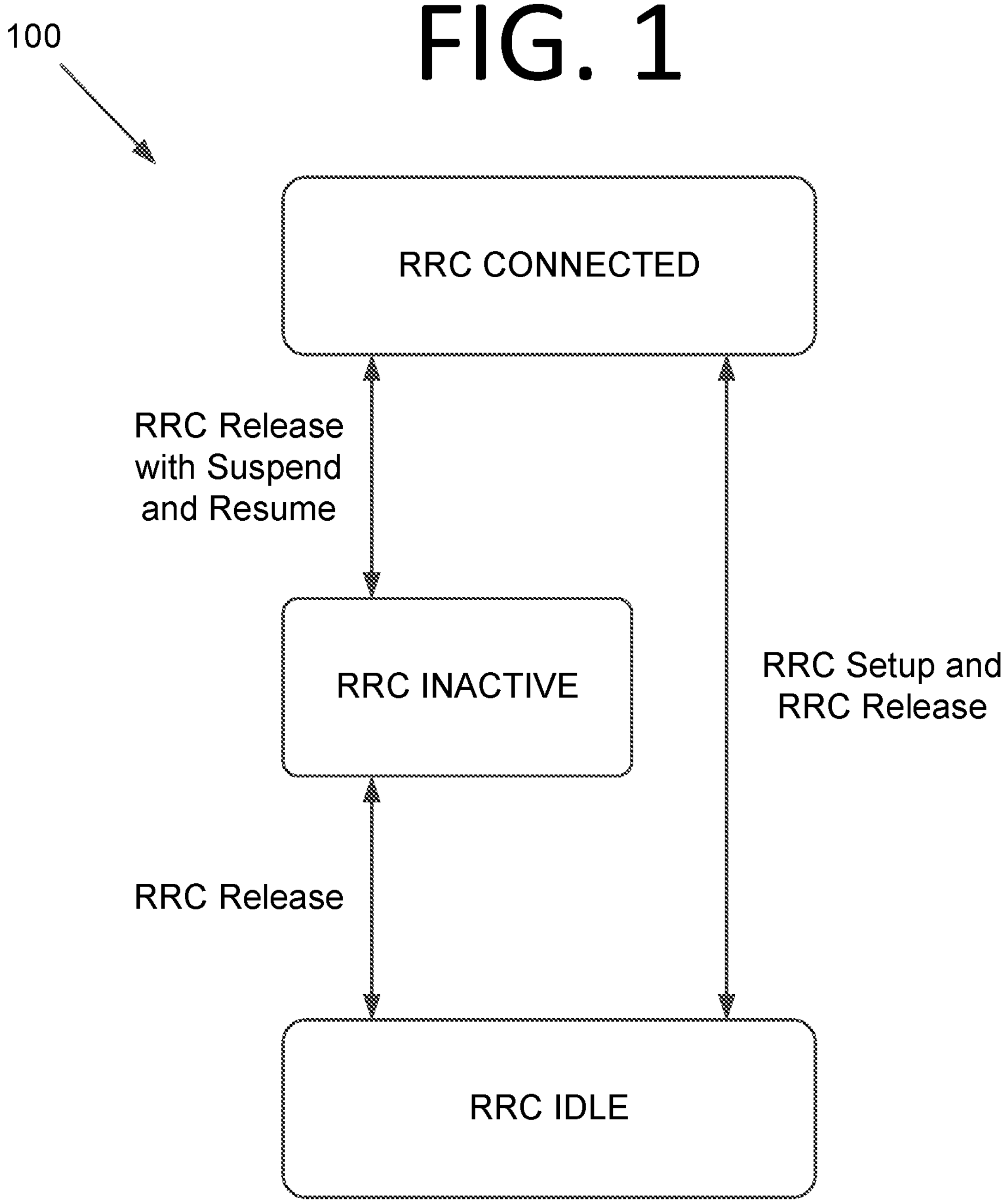
RELATED ART FIG. 1
FIG. 1 illustrates the Radio Resource Control (RRC) states for New Radio (NR).

The RRC state machine for NR includes three states-RRC Connected, RRC Idle, and RRC Inactive. A UE device starts in RRC Idle mode when it first camps on a 5G cell. This could be after the UE device is initially switched on or after inter-system cell reselection from 4G Long Term Evolution (LTE). The UE device makes the transition from RRC Idle to RRC Connected by completing the RRC Setup procedure. The UE device also makes the transition from RRC Inactive to RRC Connected by completing the RRC Resume procedure. RRC states 100 for NR are shown in FIG. 1.

In the RRC Connected state, the UE device has the ability to actively transfer both application data and signaling between itself and the wireless network. A UE device in RRC Connected mode is configured with at least one SRB and typically with one or more Data Radio Bearers (DRBs). The SRB(s) can be used to transfer signaling messages between the UE device and the base station and the DRB(s) can be used to transfer application data between the UE device and the base station.

In the RRC Idle state, the UE device is reading system information from the BCCH and performing periodic Registration Area updates with the Access and Mobility Management Function (AMF) to ensure that the AMF knows which Tracking Area to forward paging messages to. The UE device goes into RRC Idle mode to save power. The RAN does not track the location of the UE device in RRC Idle mode. Rather, the AMF is responsible for tracking the location of the UE device with a resolution of a Registration Area, which includes one or more Tracking Areas.

Each Tracking Area includes one or more cells, and Tracking Areas do not overlap. A Tracking Area could be a county or some other contiguous area serving subscribers, for example. The UE device completes a Tracking Area update procedure when it moves into a Tracking Area to which it is not registered. In other words, the UE device lets the AMF know which Tracking Area it has moved into. The base station can provide the AMF with a recommended RAN node for paging, but there is no guarantee that the UE device remains within the coverage area of that RAN node when in RRC Idle.

The UE device transitions from the RRC Connected state to the RRC Inactive state using the RRC Release procedure. The RRC Inactive state allows the UE device to return to the RRC Connected state by performing the RRC Resume procedure and start transferring application data and/or signaling messages with minimal latency. Signaling load is reduced as compared to the RRC Idle to RRC Connected state transition since the UE device context is already established. This is because 3GPP's purpose in creating RRC Inactive mode was to move processing from the core network to the edge of the network, which helps to provide low latency services, for example. When in RRC Inactive mode, the UE device checks in periodically with the current cell site (i.e., at the RAN level), but the core network (i.e., the AMF thereof) is not informed. In other words, the AMF of the core network believes that the UE device is in RRC Connected mode and in the cell site of the last Cell-ID that the AMF was notified of.

When a UE device is in RRC Connected mode, the AMF has the current Cell-ID for that device. However, when a UE device is in RRC Idle mode, the AMF does not know the current location of the UE device. Rather, the AMF has the last known Cell-ID and a timestamp of when the last known Cell-ID was received while the UE device was most recently in RRC Connected mode.

When a communication intended for a UE device is received (e.g., an email, a phone call, a text message, etc.), the AMF of the core network pages the UE device. The RAN then attempts to send the page to the UE device using a 4G or 5G paging procedure. The UE device may be identified by its IMEI, IMSI, Subscriber Identity Module (SIM) identifier, Mobile Subscriber Identification Number (MSIN), etc. It should be noted that while the 4G and 5G paging procedures are similar, a few differences do exist therebetween, such as the 5G paging procedure not allowing a UE device to be addressed using its IMSI.

The UE device listens for pages while in RRC Idle or RRC Inactive mode. The core network is responsible for the RRC Idle paging procedures, whereas the RAN is responsible for the RRC Inactive paging procedures. When a target UE device is in idle mode (e.g., RRC Idle) or inactive mode (e.g., RRC Inactive), the UE device can be paged to bring it into active mode (e.g., RRC Connected) and the location of the target UE device can then be requested and obtained. When a location consumer requests the location of a target UE device, the AMF has the last known Cell-ID for idle mode and what the AMF believes to be the current Cell-ID for inactive mode. However, the target UE device may have traveled to a different cell, per the above.

When the location consumer first requests the location of the idle or inactive UE device, the next operation taken by the AMF depends on the state of the UE device. If the UE device is in idle mode, the AMF pages the UE device and causes the UE device to be temporarily pushed into active mode via the RRC Setup procedure to acquire the serving Cell-ID of the target UE device. For inactive mode, it is the RAN that performs paging in a cluster, which is discussed in more detail herein.

3GPP supports NPLI. The NPLI service as specified by 3GPP is used for purposes other than positioning, such as providing a location-based policy for the UE device when it is in a specific area. In other words, the policies of the UE device may be changed based on the location. For instance, the NPLI service is responsible for retrieving the access network information in the Internet Protocol (IP) Multimedia Subsystem (IMS) network architecture.

The Namf_Location service is used by NF service consumers to request for the AMF to initiate positioning requests and provide location information. It is also used to subsequently provide notification of location change events towards the NF service consumers. This NF service allows NFs to request the current geodetic and optionally local and/or civic location of a target UE device, be notified of event information related to emergency sessions, request NPLI and/or local time zone corresponding to the location of a target UE device, request the ranging and sidelink positioning location results for a group of at least two UE devices (the ranging and sidelink positioning location results may include absolute locations, relative locations, or ranges and directions related to the UE devices), and location reporting over the User Plane (UP).

3GPP Technical Specification (TS) 29.518 Clause 5.5.2.4 specifies the "ProvideLocationInfo" service operation to enable an NF Service Consumer to request the NPLI that makes it possible to page an idle target device. An NF invokes the service operation by sending a POST request to the Uniform Resource Indicator (URI) of the "provide-loc-info" custom operation on the "Individual UE Context" resource on the AMF. Upon success, the AMF returns a response that contains a "ProvideLocInfo" data structure including the NPLI. The ProvideLocInfo data structure has the following format.

TABLE 1

ProvideLocInfo Data Structure Format

| Attribute Name | Data Type | P | Cardinality | Description |
|---|---|---|---|---|
| currentLoc | boolean | C | 0 . . . 1 | This Information Element (IE) shall be present, if the 5GS location information is requested by the NF Service consumer. When present, this IE shall be set as follows: true: the current location of the UE device is |

TABLE 1-continued

| ProvideLocInfo Data Structure Format | | | | |
|---|---|---|---|---|
| Attribute Name | Data Type | P | Cardinality | Description |
| | | | | returned. false: the last known location of the UE device is returned. |
| location | UserLocation | O | 0 . . . 1 | If present, this IE shall contain the location information of the UE. This IE shall convey exactly one of the following: Evolved Universal Mobile Telecommunications Service (UMTS) Radio Access (E-UTRA) user location. NR user location. Non-3GPP access user location. If the additionalLocation IE is present, this IE shall contain either a E-UTRA user location or an NR user location. |
| additionalLocation | UserLocation | O | 0 . . . 1 | This IE shall be present if the "location IE" is present and the AMF reports both a 3GPP user location and a non-3GPP access user location. When present, this IE shall convey the non-GPP access user location. |
| geoInfo | GeographicArea | O | 0 . . . 1 | If present, this IE shall contain the geographical information of the UE. If geographical information is returned by the AMF, it shall be encoded in the "geoInfo" attribute and the "geographicalInformation" attribute within the "location" attribute shall not be used. |
| locationAge | AgeOfLocation Estimate | O | 0 . . . 1 | If present, this IE shall contain the age of the location information. If an age of location estimate is returned by the AMF, it may be provided either in the "locationAge" attribute or in the "ageOfLocation Information" attribute within the "location" attribute. |
| ratType | RatType | O | 0 . . . 1 | If present, this IE shall contain the current RAT type of the UE device. |
| Timezone | TimeZone | O | 0 . . . 1 | If present, this IE shall contain the local time zone of the UE device. |
| supportedFeatures | Supported Features | C | 0 . . . 1 | This IE shall be present if at least one optional feature defined in Clause 6.4.8 of 3GPP TS 29.518 is supported. |

However, some embodiments use NPLI for positioning purposes instead. In 5G, the AMF service operation Namf_Location_ProvideLocationInfo can be used to retrieve the NPLI of a target UE device. The UE device is identified by a Subscription Permanent Identifier (SUPI), and the AMF provides the available location information to the requesting ADMF. This location information may include the Cell-ID, the Tracking Area identity, geographical/geodetic information, the current Radio Access Technology (RAT) type, the local time zone, etc.

When a location consumer requests the location of a UE device in idle or inactive mode (if using 3GPP 5G Rel-15 or Rel-16, for example), the AMF pages the UE device and sends an NPLI message as well. 3GPP Technical Specification (TS) 29.518 Clause 5.5.2.4 specifies the "ProvideLocationInfo" service operation to enable an NF Service Consumer to request the NPLI that makes it possible to page an IDLE target device. An NF invokes the service operation by sending POST request to the Uniform Resource Indicator (URI) of the "provide-loc-info" custom operation on the "Individual UE Context" resource.

For idle mode, paging of the UE device is initiated not only in the cell of the last known Cell-ID, but also in other cells in a search area (i.e., the Tracking Area). In inactive mode, the paging is performed by the RAN and not the AMF, which believes the UE device is in active mode. The RAN pages a cluster of cell sites in which the UE device is located. 5G defines the concept of a RAN Notification Area (RNA, also called a "cluster" herein), which is similar to the core network tracking area for RRC Idle mode. The RNA is configured as 1 to N cells defined by a list of cells, a list of Cell-IDs, or a list of Tracking Area IDs. A UE device is reachable within a configured RNA via RAN-initiated paging. RAN-initiated paging of an inactive device uses a RAN configured UE ID (specifically, an Inactive Radio Network Temporary Identifier (I-RNTI)).

Since the AMF does not recognize active versus inactive devices, the AMF sends a Location Reporting Control (LRC) message to the last known gNB. If the UE device is still in the RNA that the last known gNB is also in, the gNB knows that the UE device is inactive. Accordingly, the gNB pages the UE device in the RNA and returns the current location through the LRC response. Otherwise, the gNB informs the AMF that the device is not in that RNA. This causes the AMF to page the UE device in the Tracking Area. When the UE device receives the page, this causes the UE device to enter active mode since the UE device expects traffic. However, there is no traffic after the page in this case.

Figure 2:
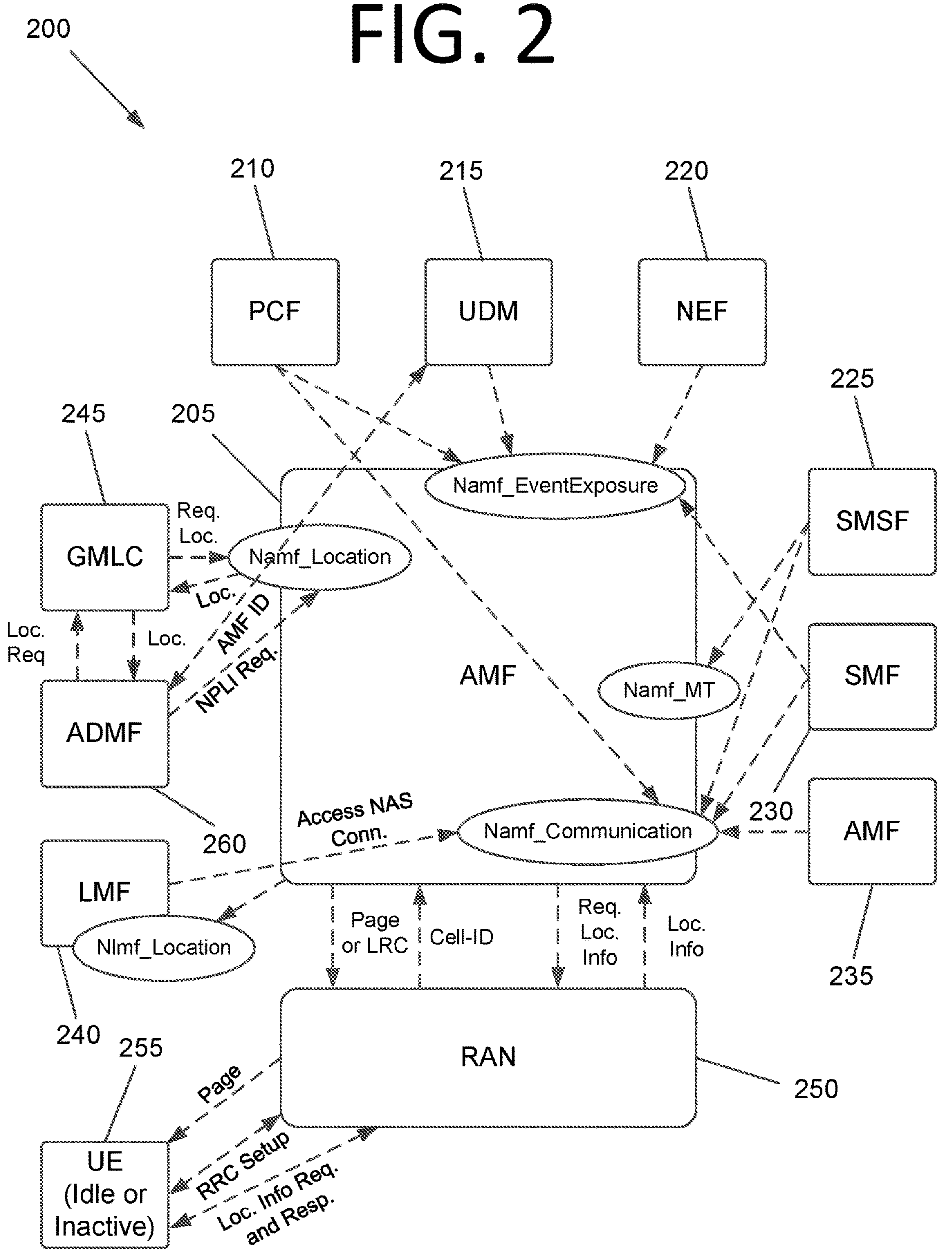
FIG. 2 illustrates an AMF services architecture that enables an ADMF to obtain location information for a UE device, according to an embodiment of the present invention.

Per the above, some embodiments enable an ADMF to obtain location information for UE devices that are in RRC Idle or RRC Inactive mode. FIG. 2 illustrates an AMF services architecture 200 that enables an ADMF 260 to obtain location information for a UE device 255, according to an embodiment of the present invention. An AMF 205 acts as a service producer for four services: Namf_Communication, Namf_EventExposure, Namf_MT, and Namf_Location. The Namf_Communication service enables an NF to communicate with the UE device through N1 Non Access Stratum (NAS) messages, to communicate with the RAN, or to communicate with other access networks. The Namf_EventExposure service allows NFs to subscribe to and get notified about network events. The Namf_MT service allows an NF to make sure that the UE device is reachable to send a message to the UE device (e.g., a Mobile Terminating (MT) Short Message Service (SMS) message). The Namf_Location service enables an NF to request location information for a target UE device.

NFs interact with AMF 205 via the Application Programming Interfaces (APIs) of these services. These NFs include a Policy Control Function (PCF) 210, Unified Data Management (UDM) 215, Network Exposure Function (NEF) 220, Short Message Service Function (SMSF) 225, Session Management Function (SMF) 230, other AMFs such as AMF 235, Location Management Function (LMF) 240, and Gateway Mobile Location Center (GMLC) 245. PCF 210, UDM 215, NEF 220, and SMF 230 use APIs of the Namf_EventExposure service. SMSF 225 uses APIs of the Namf_MT service. PCF 210, SMSF 225, SMF 230, other AMF 235, and LMF 240 use APIs of the Namf_Communication service. GMLC 245 uses APIs of the Namf_Location service. AMF communicates with UE device 255 via RAN 250.

An ADMF 260 obtains the AMF ID of the AMF responsible for tracking UE device 255 (i.e., AMF 205) from UDM 215. ADMF 260 then causes AMF 205 to page UE device 255 if it is in the idle state or send an LRC message if UE device 255 is in the connected or inactive state. In the latter case, AMF 205 does not know whether the device is in RRC Connected or RRC Inactive mode. Also, the disaggregated RAN allows intra-gNB handovers (e.g., the same Centralized Unit (CU), but different Radio Units (RUs) or both different RUs and Distributed Units (DUs) in Open RAN (O-RAN)). These handovers will not be reported to AMF 205 unless AMF 205 sends an LRC message. AMF 205 then responds to ADMF 260 with the current Cell-ID (i.e., the NR Cell Global Identifier (NCGI)) of UE device 255.

GMLC 245 is a platform that locates UE devices without the need for an Internet connection or a tracking application on the UE device. By acquiring the location of the UE device, Location-Based Services (LBS) are enabled, such as emergency services, vehicle tracking, location-based advertising, LI, etc. LMF 240 manages the overall coordination, calculation, and scheduling of resources required to determine the geographical location of a UE device in the network. For instance, LMF 240 may provide the geodetic location, civic location, the positioning methods that were used, etc. GMLC 245 can be integrated with Serving Mobile Location Centers (SMLCs) to increase the precision of location reporting.

If the accurate location of UE device 255 is desired by ADMF 260, ADMF 260 sends a location request to GMLC 245. GMLC 245, in turn, requests the location information from AMF 205 via the Namf_Location_ProvidePositioningInfo or Namf_Location_ProvideLocationInfo service. This causes AMF 305 to request the location from LMF 240 using the Nlmf_Location_DetermineLocation service. LMF 240, via AMF 205, obtains the location information from RAN 250 and UE 255. NR Positioning Protocol A (NRPPa) may be used to carry the positioning information between RAN 250 and LMF 240 over the Next Generation Control Plane interface (NG-C). These additions in the 5G architecture provide the framework for positioning in 5G. LMF 240 configures UE device 255 using the Long Term Evolution (LTE) Positioning Protocol (LPP) via AMF 205. The RAN configures UE 255 using RRC over LTE-Uu and NR-Uu.

LMF 240 performs location calculations and provides the location to GMLC 245 through AMF 205. GMLC 245 then provides the location to ADMF 260. It should be noted that this occurs after AMF 205 and/or RAN 250 sends the intelligent page to push UE device 255 into active mode. It should also be noted that the operation is performed without the user of UE device 255 being notified.

Figure 3A:
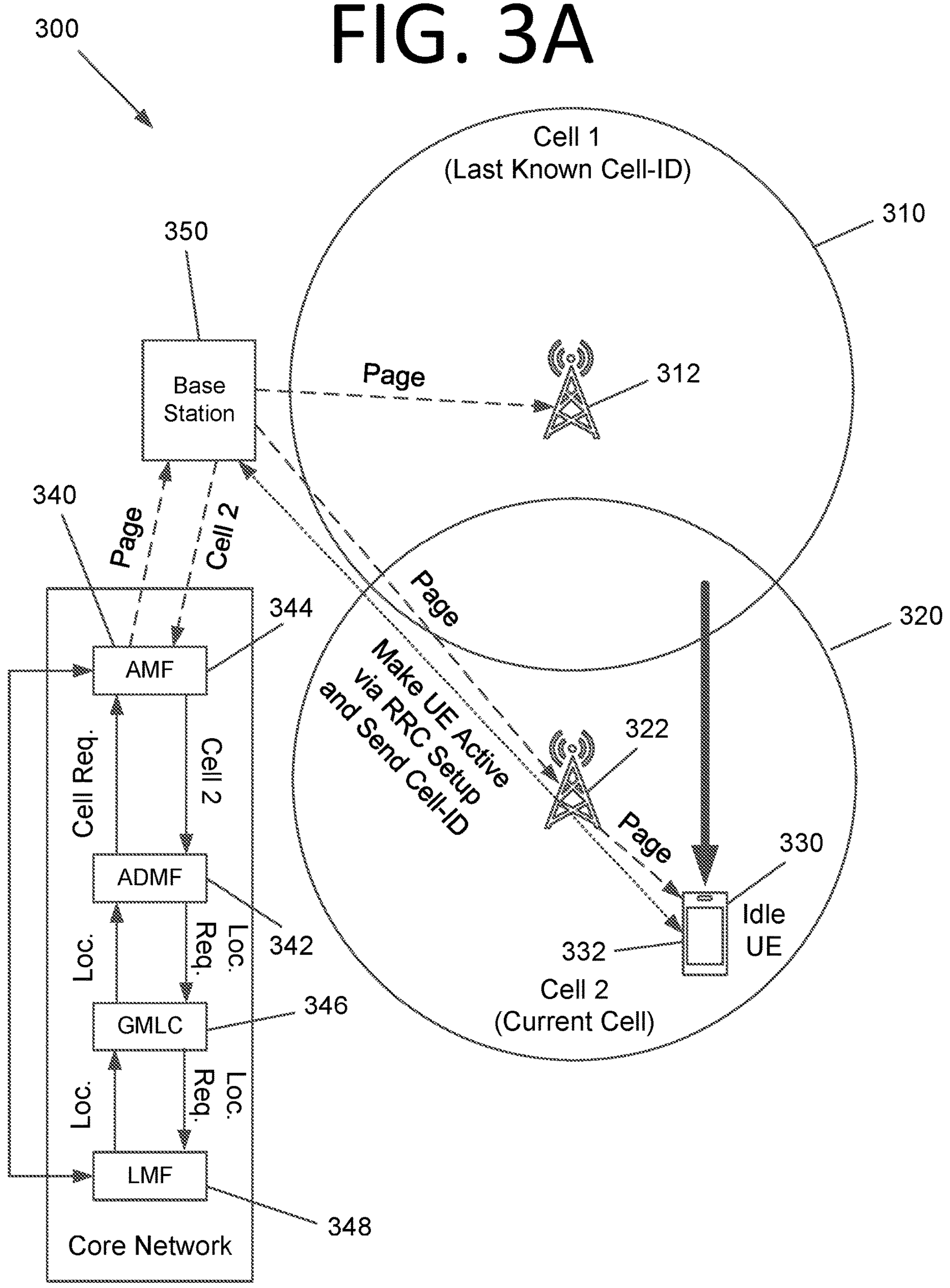
FIG. 3A illustrates a scenario where an idle UE device has moved into a different cell than that of the last known Cell-ID, according to an embodiment of the present invention.

FIG. 3A illustrates a scenario 300 where an idle UE device 330 has moved into a different cell 320 than that of the last known Cell-ID, according to an embodiment of the present invention. A pair of cells 310, 320 are provided by respective cell sites 312, 322. UE device 330 is in idle mode and has moved into cell 320, per the above, although cell 310 is the cell associated with the last known Cell-ID.

A core network 340 includes an ADMF 342 and an AMF 344. ADMF 342 requests the current location of UE device 330 from AMF 344. AMF 344 sends a page (i.e., Next Generation Application Protocol (NGAP) paging in 5G) to a base station 350 in the Tracking Area for UE device 330, as well as to any other base stations responsible for the Tracking Area. Base station 350, in turn, pages all cell sites in a Tracking Area, including cell sites 312, 322.

In the case of idle mode, in some embodiments, AMF 344 may instruct base station 350 to try paging the cell site associated with the last known Cell-ID first rather than the entire Tracking Area (i.e., cell site 312 in this example). In certain embodiments, AMF 344 may assume that UE device 330 is still in the last known cell if less than a predetermined amount of time has elapsed (e.g., one minute, 5 minutes, 10 minutes, half an hour, etc.). Naturally, if the user of UE device 330 is driving, on a train, etc., UE device 330 will leave the last known cell relatively quickly.

While in idle mode in cell 320, UE device 330 occasionally checks in with the base station of cell site 322 (i.e., base station 350) in accordance with the RRC Idle state logic. UE devices have an inactivity timer. When a UE device is inactive for a period of time in 5G, the UE device transitions to RRC Inactive mode (in 5G networks), and then to RRC Idle mode after a second inactivity time period. These inactivity time periods may be different in some embodiments. The length of the inactivity timer can be configured by device vendors and/or the carrier (e.g., set to 30 seconds).

Responsive to receiving the page from AMF 344, base station 350 pages cell sites 312, 322. Responsive to receiving the page, UE device 330 sends an RRC Setup request to base station 350. UE device 330 and base station 350 complete the RRC Setup procedure, placing UE device 330 in an RRC Connected state. Base station 350 then notifies AMF 344 that this is the case and provides AMF 344 with the Cell-ID of cell 320. AMF 344 informs ADMF 342 of the Cell-ID of cell 320. However, unlike pages for incoming texts, calls, emails, etc., the page in this case is for putting UE device 330 into active mode for location tracking purposes and additional data (i.e., voice, text, or application data traffic) is not provided. UE device 330 may then transition back to the RRC Idle (or RRC Inactive) state based on its inactivity timer(s) to conserve battery power and/or so the user of UE device 330 does not know that the connection was made, for example. ADMF 342 may repeatedly send requests to AMF 344 for the current Cell-ID of UE device 330, which AMF 344 tracks each time UE device 330 is in RRC Connected mode. The paging period of the repeated requests is up to ADMF 242.

More accurate positioning for UE devices can also be provided in LI scenarios, per the above. Core network 340 also includes a GMLC 346 and an LMF 348. To obtain location information from UE device 330 and the RAN (including base station 350), LMF 348 uses services from AMF 344 to access the NAS connection to UE device 330 and the N2 connection to the RAN, respectively. GMLC 246 receives the location of the target device calculated by LMF 248 and sends it to ADMF 242.

Using GMLC 346 and LMF 348, the wireless network can provide the accurate location of target UE device 330 (e.g., in three-dimensional coordinates) to the consumer of the location information. These location tracking NFs can only provide the location of an active UE device. This is why intelligent paging is used to temporarily bring target UE device 330 into active mode, allowing the accurate Cell-ID to be obtained and also allowing GMLC 346 and LMF 348 to be used to acquire its location.

Figure 3B:
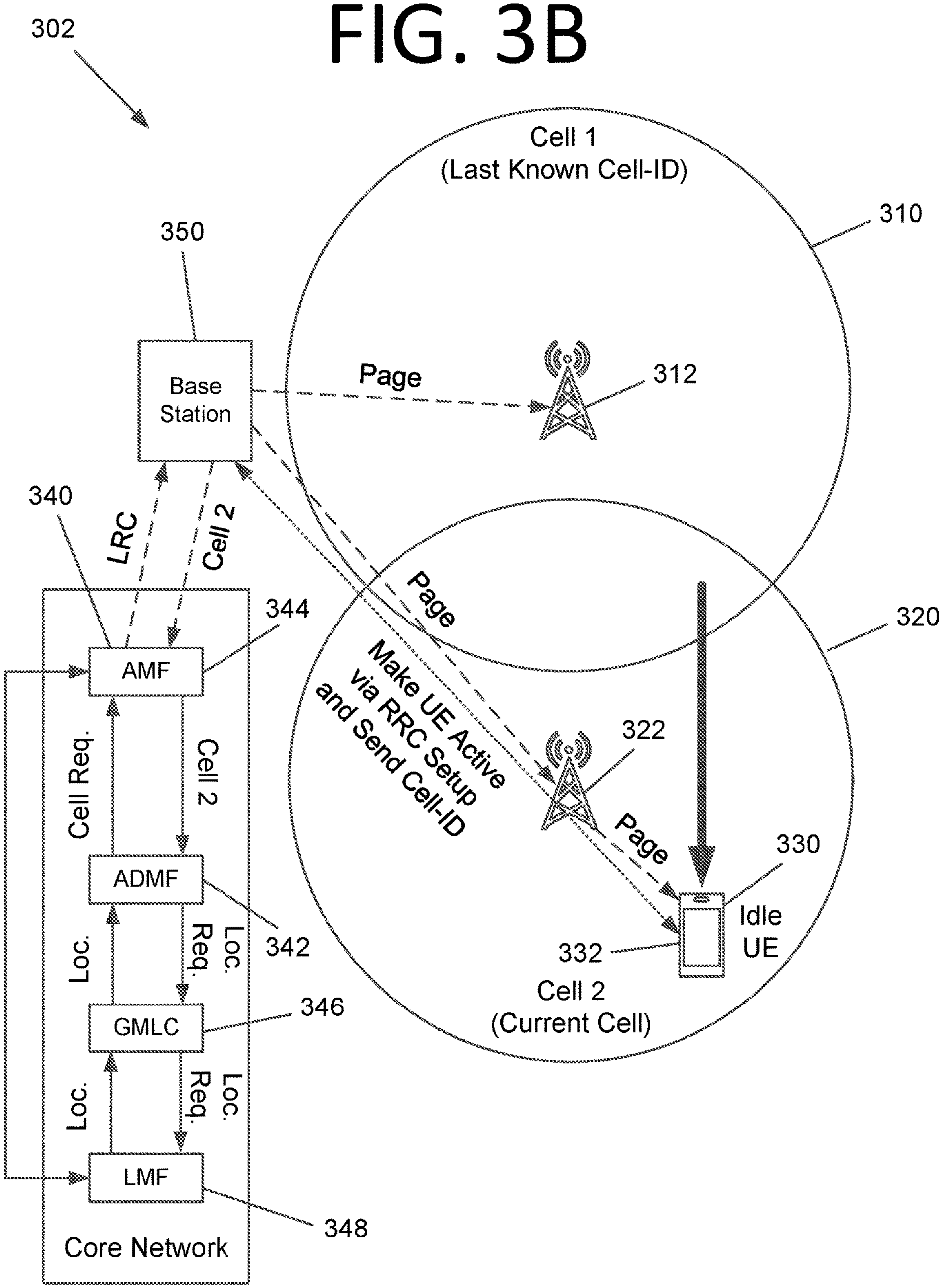
FIG. 3B illustrates a scenario where a UE device in inactive mode has moved into a different cell than the last cell that the UE device communicated from, according to an embodiment of the present invention.

FIG. 3B illustrates a scenario 302 where UE device 330 in inactive mode has moved into a different cell than the last cell that UE device 330 communicated from, according to an embodiment of the present invention. This occurs due to an inactivity timer expiring, causing UE device 330 to perform an RRC Suspend operation and enter the RRC Inactive state. Per the above, AMF 344 is not aware that UE device 330 is in an inactive state. Rather, only the RAN has this information.

AMF 344 sends an LRC message to base station 350, which is the last known base station. Base station 350 knows that UE device 330 is in the inactive state, and thus, base station 350 pages the cell sites in the cluster, which includes cells 310, 320. If UE device 330 does not respond, base station 350 informs AMF 344. This causes AMF 344 to page for the UE device in the Tracking Area in the manner discussed with respect to FIG. 3A.

In this example, UE device 330 sends an RRC Setup request to base station 350. UE device 330 and base station 350 complete the RRC Setup procedure, placing UE device 330 in an RRC Connected state. Base station 350 then provides AMF 344 with the Cell-ID of cell 320. AMF 344, in turn, informs ADMF 342 of the Cell-ID of cell 320. However, unlike pages for incoming texts, calls, emails, etc., the page in this case is for putting UE device 330 into active mode for location tracking purposes and additional data (i.e., voice, text, or application data traffic) is not provided. The accurate location of UE device may also be obtained in the same manner discussed with respect to FIG. 3A.

Figure 4:
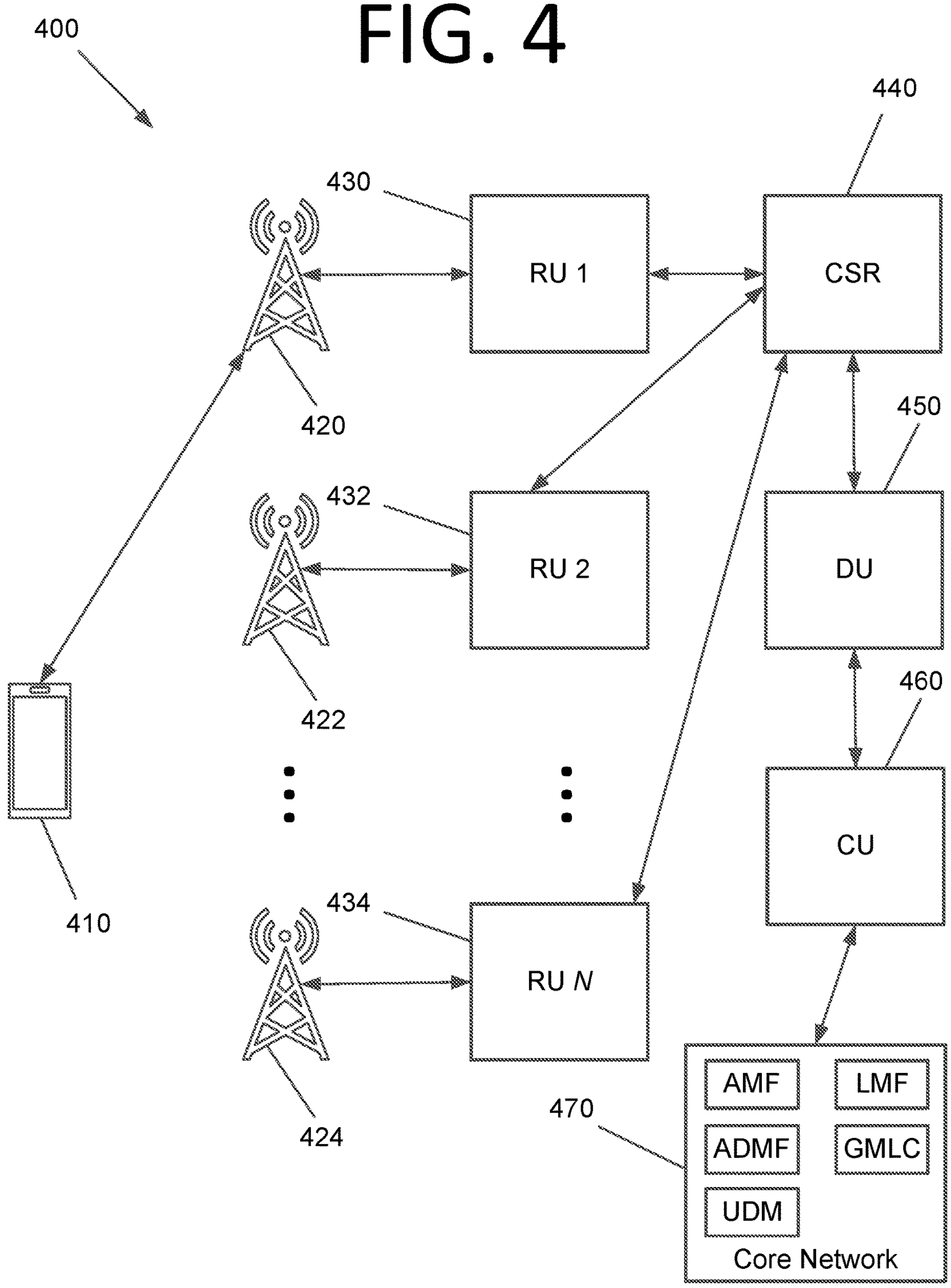
FIG. 4 is an architectural diagram illustrating an Open Radio Access Network (O-RAN) that is configured to implement intelligent paging for UE devices, according to an embodiment of the present invention.

FIG. 4 is an architectural diagram illustrating an O-RAN 400 that is configured to implement intelligent paging for UE devices, according to an embodiment of the present invention. While O-RAN 400 is a 5G NR network in this example, it should be noted some embodiments may be applied to older technologies (e.g., 4G networks) or to future technologies (i.e., Sixth Generation (6G) networks and beyond) without deviating from the scope of the invention. In the O-RAN architecture, RAN 400 includes three main building blocks: N RUs 430, 432, . . . , 434, a DU 450 (although more than one DU may be included in RAN 300), and a CU 460 (although more than one CU may be included in RAN 400). Typically, there are more DUs than CUs in the O-RAN architecture.

The key concept of O-RAN is "opening" the protocols and interfaces between the various building blocks (i.e., radios, hardware, and software) in the RAN. The O-RAN Alliance has defined various interfaces within the RAN, including those for fronthaul between the RU and the DU, midhaul between the DU and the CU, and backhaul connecting the RAN to the core network. The CU accommodates the higher protocol stack layers while the DU accommodates the lower protocol stack layers.

In RAN 400, RUs 430, 432, . . . , 434 transmit, receive, amplify, and digitize radio frequency signals and are operably connected to and located near and/or integrated into N respective antennas 420, 422, . . . , 424 of their cell sites. Each cellular telecommunications tower may have multiple RUs of RUs 430, 432, . . . , 434 to fully service various bands for a particular coverage area. DU 450 receives the digitized radio signals from respective RUs 430, 432, . . . , 434 that it manages via a Cellular Site Router (CSR) 440 that routes traffic from RUs 430, 432, . . . , 434 to DU 450.

DUs are the main processing units that are responsible for the High Physical, Medium Access Control (MAC), and Radio Link Control (RLC) protocols in the RAN protocol stack under the 3GPP. In other words, DUs are a logical encapsulation of the 3GPP stack. In O-RAN or virtualized RAN (vRAN), DUs are typically servers based on an Intel® architecture that are optimized to run the real time RAN functions located below split 2 and to connect with the RUs through a fronthaul interface based on O-RAN split 7-2x. DUs perform Layer 1 (L1) and lower Layer 2 (L2) processing.

After performing High Physical, MAC, and RLC operations, DU 450 sends digitized radio signals to a CU 460 for further processing. CU 460 is responsible for non-real time, higher L2 and Layer 3 (L3) functions. CU 460 also controls the operation of DU 450.

CU 460 runs the RRC and Packet Data Convergence Protocol (PDCP) layers. In 5G networks, a gNB may include CU 460 and DU 450, which is connected to CU 460 via F1-C(Control Plane (CP)) and F1-U (User Plane (UP)) interfaces for the CP and UP, respectively. However, per the above, there are multiple DUs in RAN 400 in some embodiments. If CU 460 has multiple such DUs, CU 460 supports multiple gNBs. The split architecture allows a 5G network to utilize different distributions of protocol stacks between CU 460 and DUs, depending on midhaul availability and network design.

CU 460 is a logical node that includes gNB functions, such as the transfer of user data, mobility control, RAN sharing (Multi-Operator RAN (MORAN)), positioning, session management etc., except for functions that are allocated exclusively to DU 450. CU 460 controls the operation of its DU(s) over the midhaul interface. In other words, CU 460 is connected to DU 450 via a midhaul link. CU 460 is also connected to a core network 470 via a backhaul link. Core network 470 is not technically part of RAN 400. In some embodiments, the backhaul link may be via satellite. Software of CU 460 can be co-located with DU software on the same server on site in some embodiments.

DU 450 is usually physically located at or near RUs 430, 432, . . . , 434 (e.g., at a cell site, in a Local Data Center (LDC), etc.), whereas CU 460 can be located nearer to core network 470 (e.g., in a Breakout Edge Data Center (BEDC)). In some cases, CU 460 may actually be located in core network 470. In some embodiments, DU 450 is offsite with respect to the cell site where respective RUs of RUs 430, 432, . . . , 434 are located, and DU 450 may be connected to CSR 440 by dark fiber, when available. For instance, dark fiber may connect CSR 440 to an LDC where DU 450 is housed. Alternatively, DU 450 may be located at the base of the cell site and connected to CU 460 via lit fiber.

Core network 470 includes various NFs, such as the AMF, ADMF, LMF, GMLC, UDM, etc. The ADMF may be located a National Data Center (NDC) and the AMF may be located in a Regional Data Center (RDC) in some embodiments. The AMF knows that UE device 410 is somewhere within a Tracking Area when UE device 400 is in RRC Idle mode and RAN 400 knows that UE device 410 is somewhere within a cluster (i.e., RNA) when UE device 410 is in RRC Inactive mode (AMF in inactive mode believes that UE device 410 is still connected to the network and in the cell of the last transmitted Cell-ID for UE 410). The AMF pages at the Tracking Area level or RAN 400 pages at the cluster level depending on whether UE device 410 is in RRC Idle mode or RRC Inactive mode, respectively. It should be noted that if UE device 410 is in RRC Inactive mode and moves from one cluster to another, RAN 400 updates the current cluster for UE device 410, but the AMF is not informed.

To page UE device 410 at the behest of the ADMF, the AMF sends the page to all cell sites in the Tracking Area for RRC Idle mode or to the cell site in RAN 400 where UE device 410 is believed to be in by the AMF for RRC Inactive mode. In other words, the paging is at the RAN level rather than at the core network level for the RRC Inactive state, and each cell site in the cluster attempts to page UE device 410. If a cell site associated with one, some, or all of RUs 430, 432, . . . , 434 is in the cluster (RNA), the page would go from the AMF to CU 460, which relays the page to DU 450, which relays the page to CSR 440, which relays the page to RU 430, which transmits the page to UE device 410 via antenna(s) 420. UE device 410 responds to the page and performs an RRC Setup procedure with the respective gNB to transition to RRC Connected mode. The AMF and/or other NFs of core network 470 then obtain the desired information from UE device 410 and/or the base station, and UE device 410 transitions back to RRC Idle or RRC Inactive mode thereafter.

Consider the case where a UE device is traveling across the country. Carriers may have multiple or many core networks for different regions with respective AMFs. The ADMF connects to the UDM to determine which AMF is covering the target UE device. If the UE device is roaming in another network, the UDM will return that information to the ADMF (i.e., by returning a Public Land Mobile Network (PLMN) ID to the ADMF). If the UE device goes outside the coverage area of an AMF to the coverage area of another AMF, this will be reported to the UDM through a Tracking Area Update procedure. If the UE device is in the home network (i.e., not roaming), the ADMF obtains the AMF ID by querying the UDM, and the ADMF will query for the location of the UE device from the relevant AMF.

Figure 5:
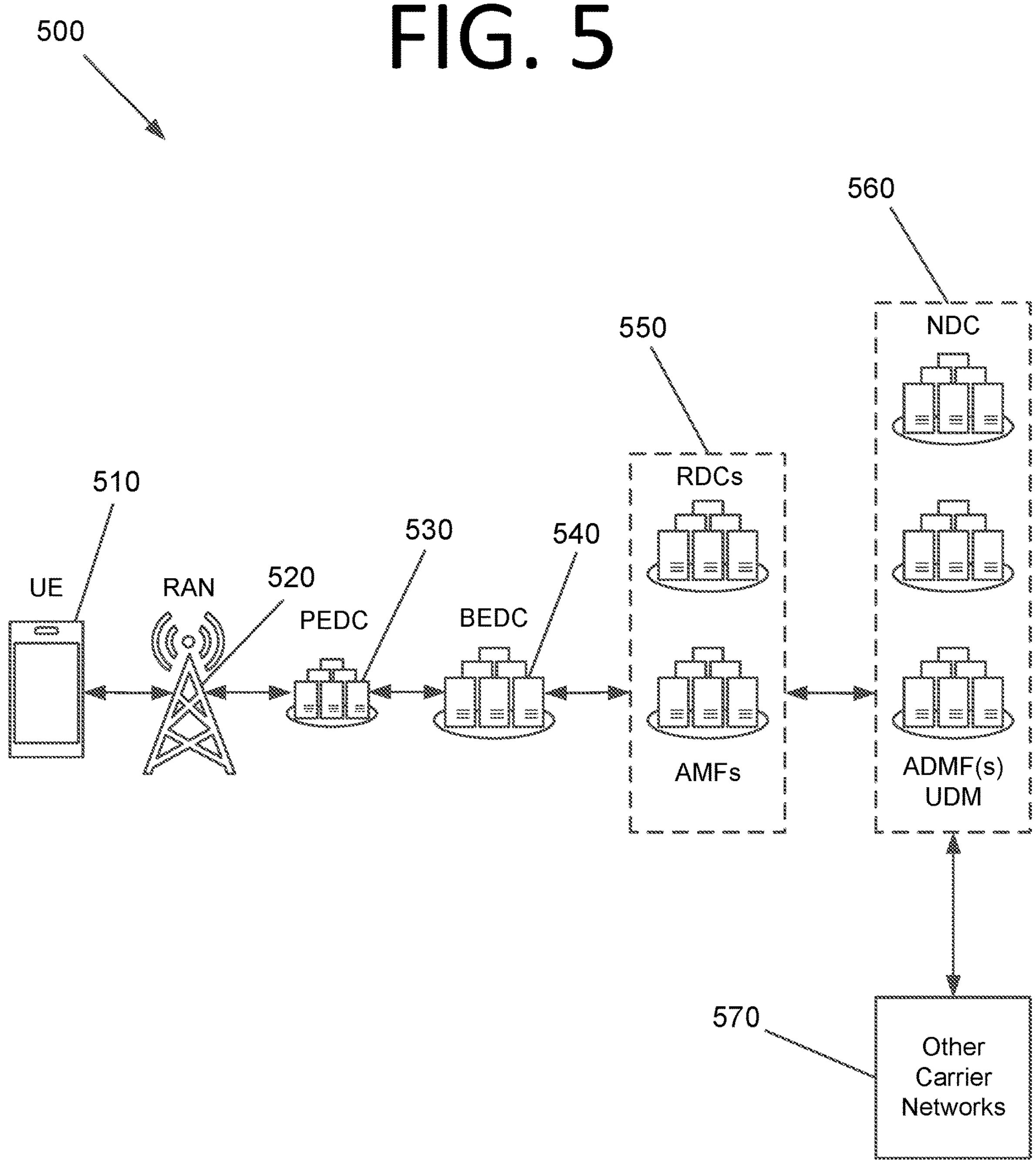
FIG. 5 is an architectural diagram illustrating a telecommunications system configured to perform intelligent paging for UE devices, according to an embodiment of the present invention.

FIG. 5 is an architectural diagram illustrating a telecommunications system 500 configured to perform intelligent paging for UE devices, according to an embodiment of the present invention. UE device 510 (e.g., a mobile phone, a tablet, a laptop computer, a smart watch, etc.) is running in idle or inactive mode. UE device 510 communicates via RAN 520, which sends communications to UE 510, as well as from UE 510 into the core carrier network. In the case of idle mode, RAN 520 informs a respective AMF of RDCs 550 when UE device 510 moves into a different Tracking Area. When UE device 510 is in inactive mode, RAN 520 tracks which cluster UE device 510 is currently in, but the AMF is unaware.

In some embodiments, communications are sent to/from RAN 520 via a Performance Edge Data Center (PEDC) 530 to provide lower latency. However, in some embodiments, RAN 520 communicates directly with a BEDC 540 or an RDC of RDCs 550. BEDCs are typically smaller data centers that are proximate to the populations they serve. BEDCs may break out UPF for data (UPF-d) packets and provide cloud computing resources and cached content to UE 510, such as providing NF application services for gaming, enterprise applications, etc. In certain embodiments, RAN 520 may include an LDC (not shown) that hosts one or more DUs in a 5G O-RAN architecture. The CU may be located in the LDC or BEDC 540, for example. LDCs, PEDCs, and/or BEDCs may provide Mobile Edge Computing (MEC) services in some embodiments.

The carrier network may provide various NFs and other services. For instance, BEDC 540 may provide cloud computing resources and cached content to mobile device 510, such as providing NF application services for gaming, enterprise applications, etc. RDC 550 may provide core network functions, such as User Plane Function (UPF) for voice (UPF-v), UPF-d (if not in BEDC 540, for example), SMF, and AMF functionality. The SMF includes Packet Data Network Gateway (PGW) Control Plane (PGW-C) functionality. The UPF includes PGW User Data Plane (PGW-U) functionality.

NDC 560 may provide Unified Data Repository (UDR) and user verification services, for example. Other network services that may be provided may include, but are not limited to, IMS+Telephone Answering Service (TAS), IP- SM Gateway (i.e., the network functionality that provides the messaging service in the IMS network), LMF, GMLC, Enhanced Serving Mobile Location Center (E-SMLC) for former generation wireless networks, LRF, Home Location Register (HLR), Home Subscriber Server (HSS), UPF+ PGW-U, AMF, HSS+UDM, Authentication Server Function (AUSF), SMF+PGW-C, Short Message Service Center (SMSC), PCF, MEC, NEFs or Common API Framework (CAPIF) for 3GPP northbound APIs, Network Slice Selection Function (NSSF), Non-3GPP InterWorking Function (N3IWF), Network Data Analytics Function (NWDAF), Mediation and Delivery Function (MDF), Service Communication Proxy (SCP), and/or Security Edge Protection Proxy (SEPP) functionality. It should be noted that additional and/or different network functionality may be provided without deviating from the present invention. The various functions in these systems may be performed using dockerized clusters in some embodiments.

BEDC 540 may utilize other data centers for NF authentication services. RDCs 550 receive NF authentication requests from BEDC 540. RDCs 550 may help with managing user traffic latency, for instance. However, RDCs 550 may not perform NF authentication in some embodiments. From RDCs 550, NF authentication requests may be sent to NDC 560, which may be located far away from UE 510, RAN 520, PEDC 530, BEDC 540, and RDCs 550.

Per the above, when an ADMF seeks the location of UE device 520, the ADMF queries the UDM of NDC 560 to determine which AMF is covering UE device 520, or whether the UE device is roaming. The UDM responds with the AMF ID of the AMF that is responsible for the Tracking Area in which UE device 520 is currently located if in the carrier network, or with the PLMN ID of the roaming network if the UE device is roaming. The UE device is put into active mode using the mechanisms discussed herein if in the carrier network. The location of UE device 510 can then be obtained by the AMF and provided to the ADMF. If a UE device is roaming in another carrier network 570, the ADMF will be informed which network the UE device is roaming in.

The UDM returns the PLMN-ID that identifies the wireless network that the UE device is roaming in to the ADMF, and therefore, to the LEA. There are two possibilities for how the LEA will handle this situation. The first is the LEA will contact the operator of the roaming network, provide the court warrant, and request the location of the UE device. Currently, this is the case.

The other option is in the case where there is an agreement between the home network operator and the mobile network operator and there is connectivity between the GMLC of the home network and the GMLC of the roaming network. In this case, the ADMF will ask the GMLC in the home network to contact the GMLC of the visited network for the location of the roaming UE device. However, it should be noted that the standard does not currently support this case.

Figure 6:
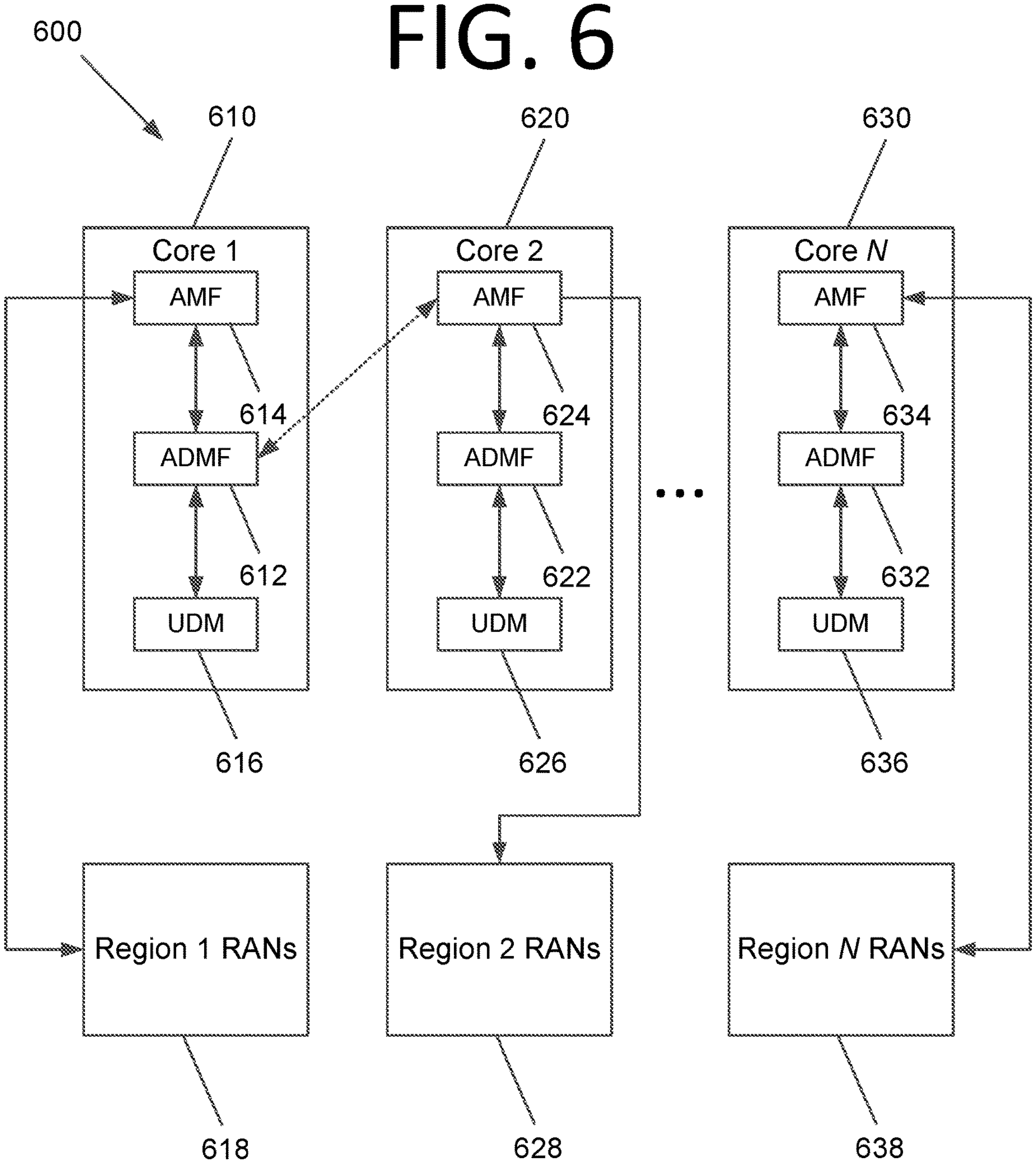
FIG. 6 is an architectural diagram illustrating a multi-core network configured to provide intelligent paging for UE devices in idle mode, according to an embodiment of the present invention.

FIG. 6 is an architectural diagram illustrating a multi-core network 600 configured to provide intelligent paging for UE devices in idle mode, according to an embodiment of the present invention. This pertains to the scenario where each core network 610, 620, . . . , 630 is providing service to a specific set of enterprises, Mobile Virtual Network Operators (MVNOs), government organizations, etc. Core networks 610, 620, . . . , 630 may or may not cover the same geographical areas, or the core networks have partially overlapping geographic areas. One of core networks 610, 620, . . . , 630 may cover the entire country, for example, but core networks 610, 620, . . . , 630 may have different NDCs. Each NDC may have its own ADMF.

Each core network 610, 620, . . . , 630 has respective ADMFs 612, 622, . . . , 632 and UDMs 616, 626, . . . , 636 in the respective NDC, as well as respective AMFs 614, 624, . . . , 634 in the RDCs. UDMs 616, 626, . . . , 636 also share current AMF IDs for UE devices with one another. Each core network 610, 620, . . . , 630 also controls respective RANs 618, 628, . . . , 638. AMFs 614, 624, . . . , 634 update the current Tracking Area of the UE device as it moves within respective RANs 618, 628, . . . , 638 if in their respective coverage area.

Consider the case where ADMF 612 seeks the location of a UE device in idle mode. ADMF 612 queries UDM 616 for the AMF that is responsible for tracking the UE device. UDM 616 responds to ADMF 612 with the AMF ID of AMF 624 is in the coverage area of RANs 628. ADMF 612 sends the location request to AMF 624. AMF 624 receives the request from ADMF 612 and pages the cell sites in the Tracking Area for the UE device. The UE device responds to the base station of the cell site for the cell that the UE device is currently in, and the UE device performs an RRC Setup procedure with the respective base station. This puts the UE device into RRC Connected mode, and the Cell-ID is obtained by AMF 624 and sent to ADMF 612. If a more accurate location is sought, this is obtained via a GMLC and LMF as discussed above. ADMF 612 may reach out to AMF 624 again for further tracking requests from ADMF 612 so long as the UE device remains within that network.

Figure 7A:
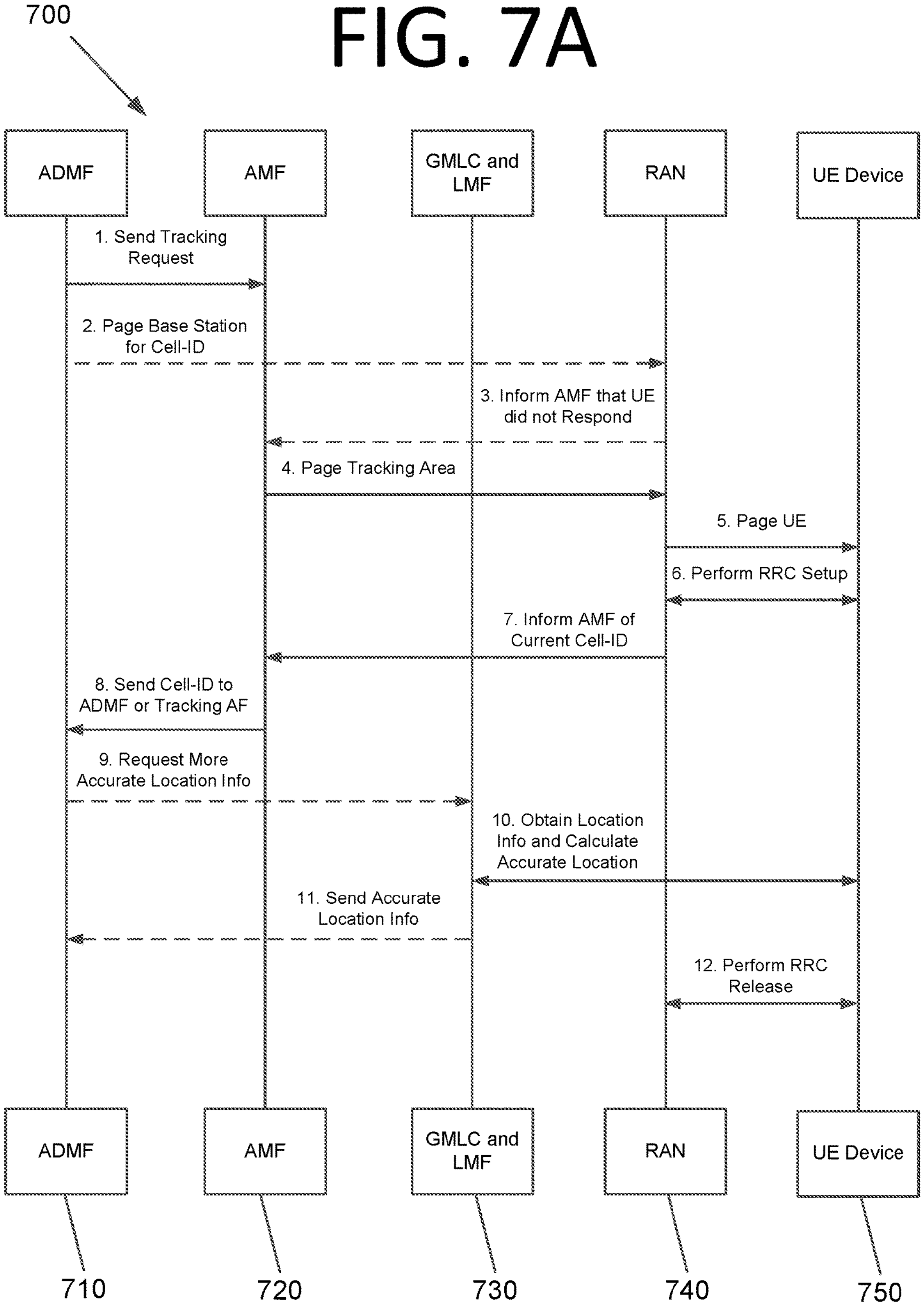
FIG. 7A is a flow diagram illustrating a process for performing intelligent paging for UE devices in idle mode, according to an embodiment of the present invention.

FIG. 7A is a flow diagram illustrating a process 700 for performing intelligent paging for UE devices in idle mode, according to an embodiment of the present invention. The process begins with an ADMF 710 sending a tracking request for a UE device 750 to an AMF 720. In some embodiments, AMF 720 first pages the cell site associated with the last known Cell-ID by sending the page to the respective base station in RAN 720. In certain embodiments, the base station associated with the last known Cell-ID is only paged if certain criteria are met (e.g., if less than a predetermined amount of time has passed since the timestamp of the last known Cell-ID). In this case, UE device 750 has moved out of this cell, so in embodiments where AMF 720 tries the cell of the last known Cell-ID first, the base station informs AMF 720 that UE device 750 did not respond to the page. This means UE device 750 has moved out of the cell, has insufficient battery power to respond, etc.

AMF 720 pages the cell sites in a Tracking Area in RAN 740. The base station for the cell that UE device 750 is currently in pages UE device 750, and the base station and UE device 750 then complete an RRC Setup procedure to transition UE device 750 into RRC Connected mode. The base station informs AMF 720 that UE device 750 is in that cell and sends the Cell-ID to AMF 720. AMF 720, in turn, sends the Cell-ID to ADMF AF 710. In some embodiments, ADMF 710 may also obtain more accurate location information via GMLC and LMF 730. GMLC 730 receives the request from ADMF 710, LMF 730 calculates the accurate location, and GMLC 730 sends the accurate location information to ADMF 710. UE device 750 may then perform an RRC Release operation to return to RRC Idle mode after an inactivity timer expires.

Figure 7B:
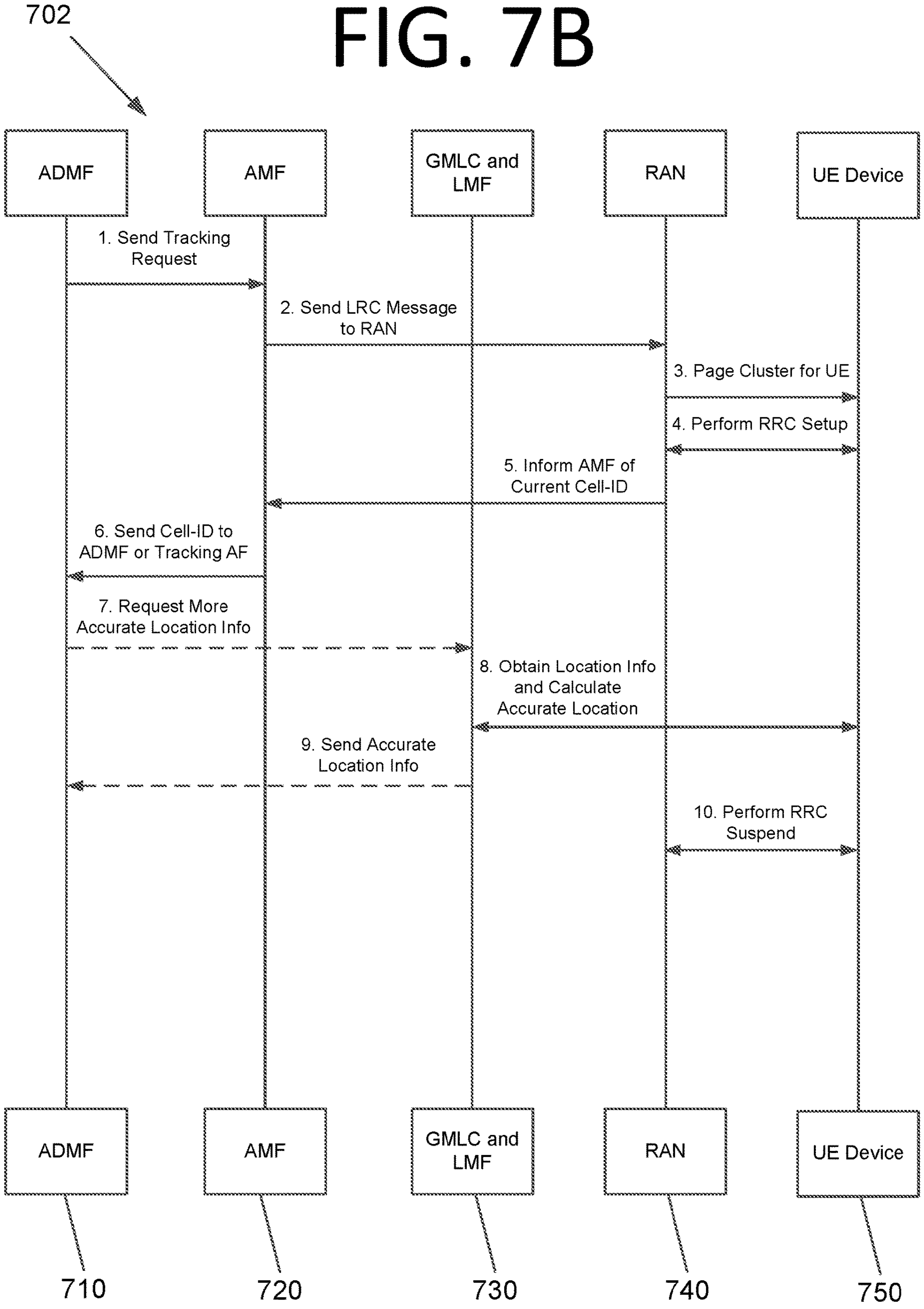
FIG. 7B is a flow diagram illustrating a process for performing intelligent paging for UE devices in inactive mode, according to an embodiment of the present invention.

FIG. 7B is a flow diagram illustrating a process 702 for performing intelligent paging for UE devices in inactive mode, according to an embodiment of the present invention. In this case, the network uses 3GPP 5G Rel-15 or Rel-16. Because UE device 750 is in inactive mode, only RAN 740 is aware of this, and AMF 720 believes that UE device 750 is in active mode. AMF 720 sends an LRC message to that base station of RAN 740 that UE device 750 last used for communication, and the base station of RAN 740 pages the cell sites in the cluster for UE device 750. UE device 750 responds to the base station, and the base station and UE device 740 then complete an RRC Setup procedure to transition UE device 750 into RRC Connected mode. The base station informs AMF 720 that UE device 750 is in that cell and sends the Cell-ID. In some embodiments, ADMF 710 may also obtain more accurate location information via GMLC and LMF 730 in the same manner discussed above with respect to FIG. 7A. UE device 750 may then perform an RRC Suspend operation to return to RRC Idle mode after an inactivity timer expires.

Figure 8:
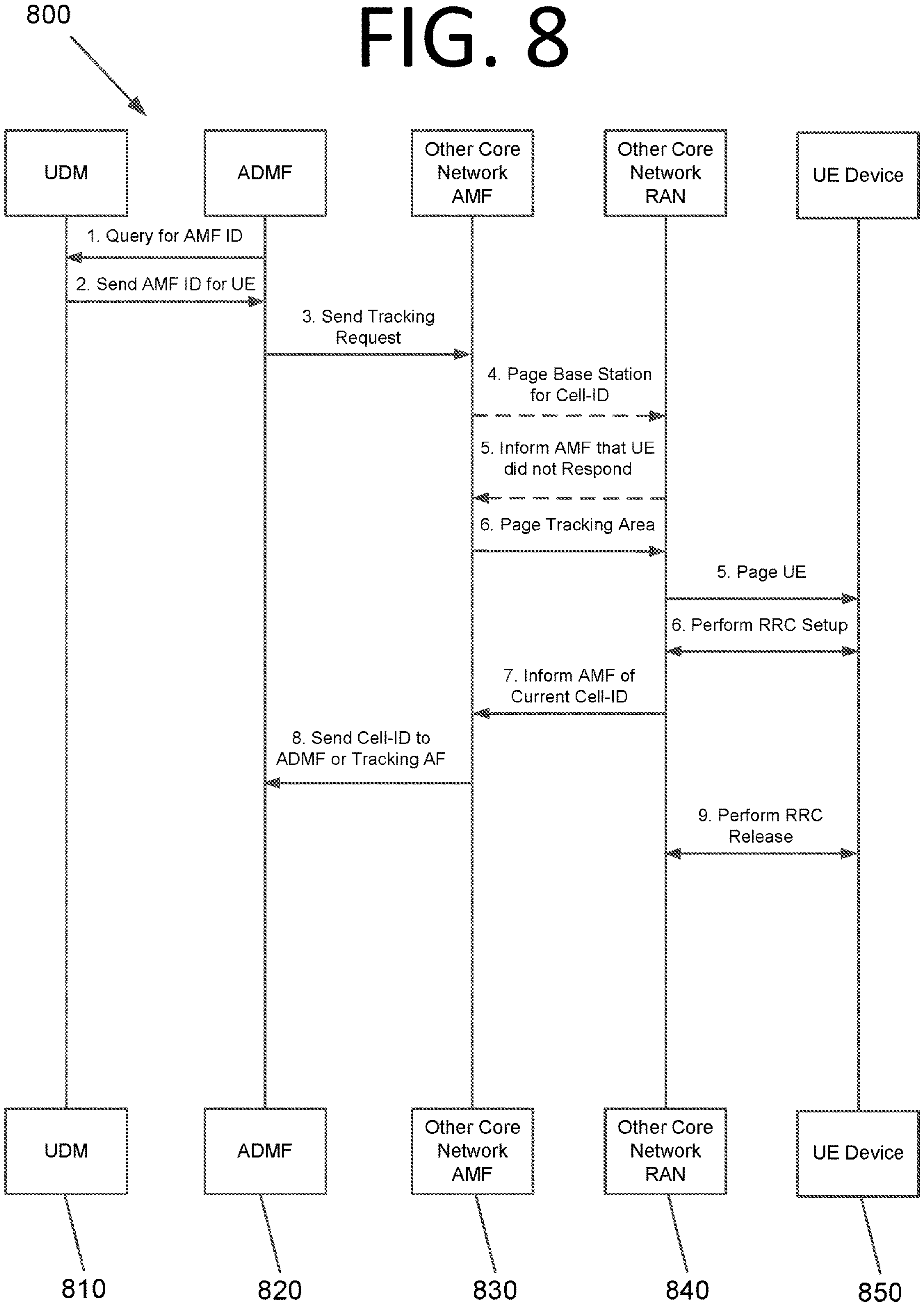
FIG. 8 is a flow diagram illustrating a process for performing intelligent paging for UE devices in idle mode across multiple core networks, according to an embodiment of the present invention.

FIG. 8 is a flow diagram illustrating a process 800 for performing intelligent paging for UE devices in idle mode across multiple core networks, according to an embodiment of the present invention. An ADMF 820 queries a UDM 810 for the AMF ID of the AMF that manages the Tracking Area for UE device 850. UDM 810 responds with the AMF ID of AMF 830, which is in a different core network from ADMF 820. In some embodiments, AMF 830 then pages the cell site associated with the last known Cell-ID by sending the page to the base station associated with the last known Cell-ID in RAN 840 of the other core network. In this case, UE device 850 has moved out of this cell, so in embodiments where AMF 830 tries the cell of the last known Cell-ID first, the base station informs AMF 830 that UE device 850 did not respond to the page.

AMF 830 pages the cell sites in a Tracking Area associated with RAN 840. The base station for the cell that UE device 850 is currently in pages UE device 850, and the base station and UE device 850 then complete an RRC Setup procedure to transition UE device 850 into RRC Connected mode. The base station informs AMF 830 that UE device 850 is in that cell and sends the Cell-ID to AMF 830. AMF 830, in turn, sends the Cell-ID to ADMF 820. In some embodiments, ADMF 820 may also obtain more accurate location information via a GMLC and a LMF in a similar manner to that discussed above with respect to FIG. 7A. UE device 850 may then perform an RRC Release operation to return to RRC Idle mode after an inactivity timer expires.

Figure 9:
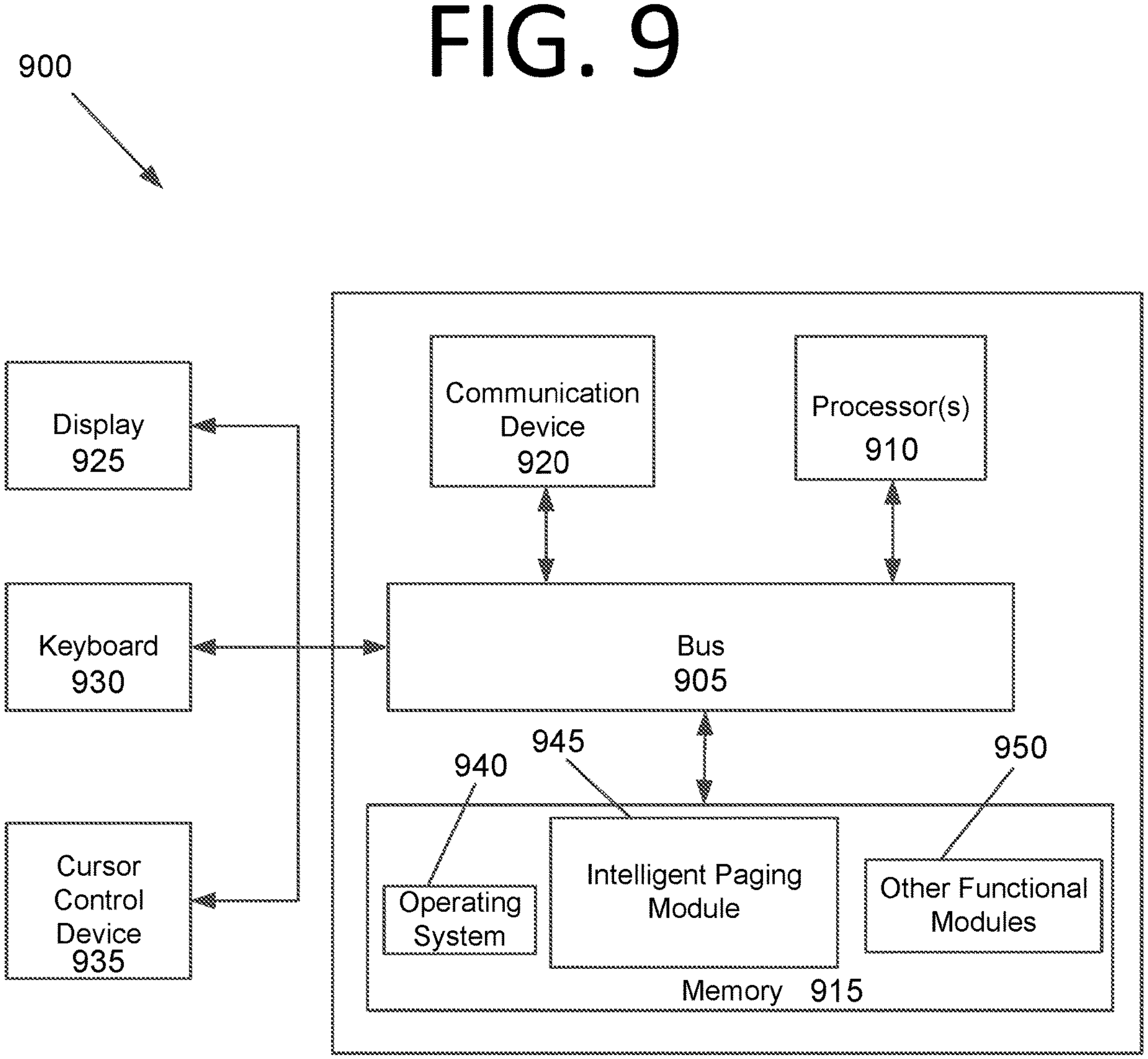
FIG. 9 is an architectural diagram illustrating a computing system configured to perform aspects of intelligent paging for UE devices, according to an embodiment of the present invention.

FIG. 9 is an architectural diagram illustrating a computing system 900 configured to perform aspects of intelligent paging for UE devices, according to an embodiment of the present invention. In some embodiments, computing system 900 may be one or more of the computing systems depicted and/or described herein, such as a UE device, a base station, another computing system of a RAN (e.g., a Radio Unit (RU), a DU, or a CU in O-RAN), a computing system of a core network, etc. Computing system 900 includes a bus 905 or other communication mechanism for communicating information, and processor(s) 910 coupled to bus 905 for processing information. Processor(s) 910 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 910 may also have multiple processing cores, and at least some of the cores may be configured to perform specific functions. Multi-parallel processing may be used in some embodiments. In certain embodiments, at least one of processor(s) 910 may be a neuromorphic circuit that includes processing elements that mimic biological neurons. In some embodiments, neuromorphic circuits may not require the typical components of a Von Neumann computing architecture.

Computing system 900 further includes a memory 915 for storing information and instructions to be executed by processor(s) 910. Memory 915 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 910 and may include volatile media, non-volatile media, or both. The media may also be removable, non-removable, or both.

Additionally, computing system 900 includes a communication device 920, such as a transceiver, to provide access to a communications network via a wireless and/or wired connection. In some embodiments, communication device 920 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), 5G, NR, any combination thereof, and/or any other currently existing or future-implemented communications standard and/or protocol without deviating from the scope of the invention. In some embodiments, communication device 920 may include one or more antennas that are singular, arrayed, phased, switched, beamforming, beamsteering, a combination thereof, and or any other antenna configuration without deviating from the scope of the invention.

Processor(s) 910 are further coupled via bus 905 to a display 925, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 725 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 930 and a cursor control device 935, such as a computer mouse, a touchpad, etc., are further coupled to bus 905 to enable a user to interface with computing system 900. However, in certain embodiments, a physical keyboard and mouse may not be present, and the user may interact with the device solely through display 925 and/or a touchpad (not shown). Any type and combination of input devices may be used as a matter of design choice. In certain embodiments, no physical input device and/or display is present. For instance, the user may interact with computing system 900 remotely via another computing system in communication therewith, or computing system 900 may operate autonomously.

Memory 915 stores software modules that provide functionality when executed by processor(s) 910. The modules include an operating system 940 for computing system 900. The modules further include an intelligent paging module 945 that is configured to perform all or part of the processes described herein or derivatives thereof. Computing system 900 may include one or more additional functional modules 950 that include additional functionality.

One skilled in the art will appreciate that a "computing system" could be embodied as a server, an embedded computing system, a quantum computing system, or any other suitable computing device or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 10:
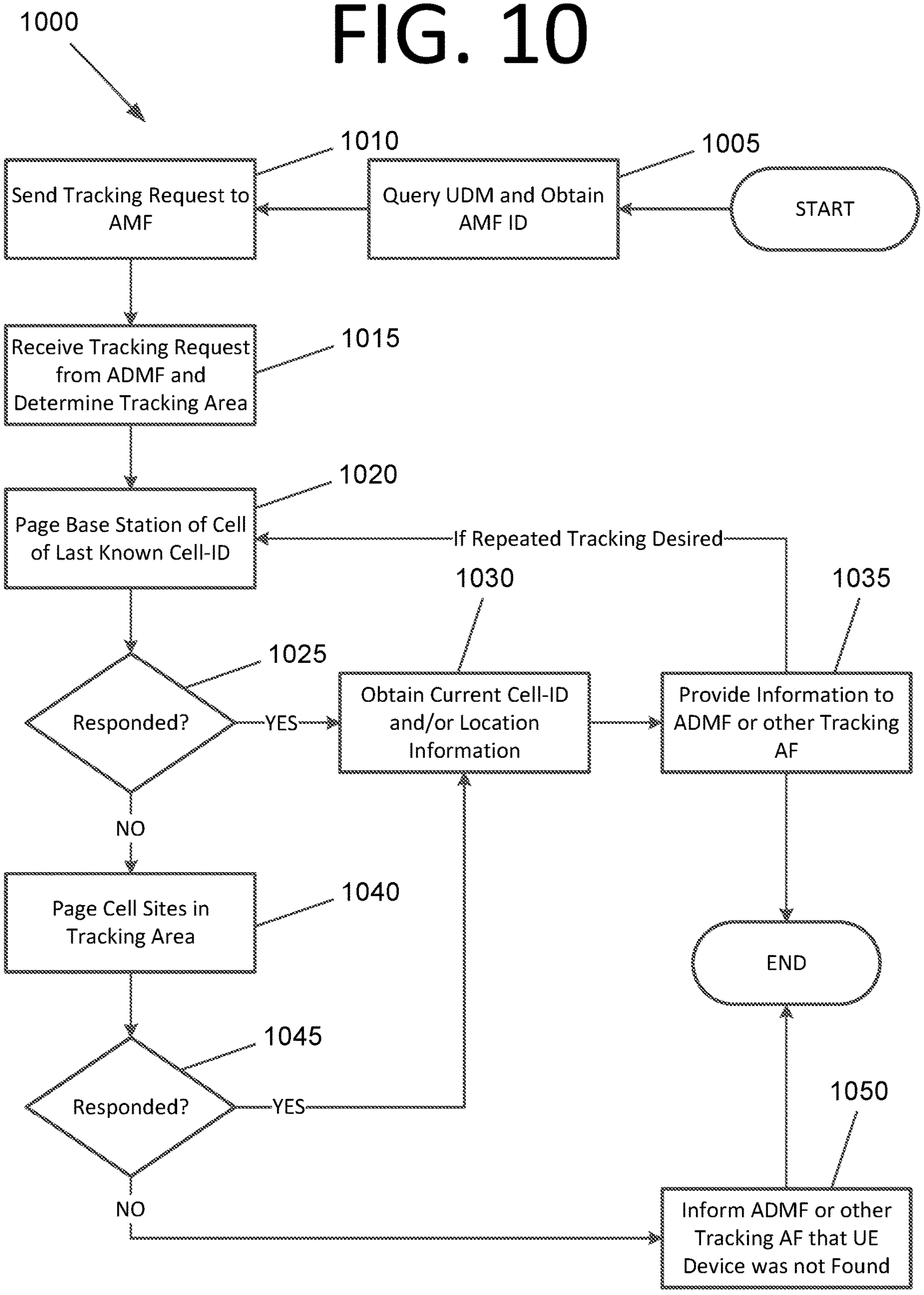
FIG. 10 is a flowchart illustrating a process for performing intelligent paging for UE devices in idle mode, according to an embodiment of the present invention.

FIG. 10 is a flowchart illustrating a process 1000 for performing intelligent paging for UE devices in idle mode, according to an embodiment of the present invention. The process begins with an ADMF querying a UDM and obtaining an AMF ID at 1005. The ADMF then sends a tracking request for a UE device to the AMF associated with the AMF ID at 1010. The AMF receives the tracking request from the ADMF and determines the Tracking Area for the UE device that the ADMF is seeking at 1015. The AMF pages a base station of a cell site associated with the last known Cell-ID of the UE device at 1020. The page for the UE device is sent without subsequently sending additional data pertaining to voice, text message, or data services for the UE device itself. In certain embodiments, this is responsive to a timestamp of a last known Cell-ID of the UE device being within a predetermined amount of time.

If the UE device responded at 1025, the base station and the UE device will have performed an RRC Setup procedure and the UE device will have transitioned to an active state. The transition of the UE device to active mode is performed without providing an indication to a user of the UE device that the transition occurred. The current Cell-ID (obtained by the AMF) and/or other location information (obtained via a GMLC and LMF) is obtained at 1030. This information is then provided to the ADMF at 1035. The UE device then transitions back to an idle or inactive mode after the Cell-ID of the current cell that the UE device is in, the location information for the UE device, or both, is obtained. If repeated tracking is desired, the process is periodically repeated.

If the UE device does not respond at 1025, the AMF pages cell sites in the Tracking Area for the UE device at 1040. If the UE device responds at 1045, the process proceeds to step 1030. However, if the UE device did not respond at 1045, the AMF informs the ADMF at 1050 that the UE device was not found and the process ends. It should be noted that in some embodiments, the ADMF is in a different core network than the AMF. In such embodiments, the ADMF sends the tracking request and location information request to the AMF and GMLC in the other core network.

In embodiments where a more accurate location is desired than the Cell-ID level, an NPLI request message is sent to the AMF by the ADMF after the UE device performs the RRC Setup procedure. This causes the GMLC to obtain location information from the AMF and the LMF and send the location information to the ADMF. In certain embodiments, the obtaining of the location information includes obtaining coordinates for the UE device using NR E-CID, DL TDOA, UL TDOA, MC-RTT, UL AoA, DL AoD, or any combination thereof. In some embodiments, the location information includes a tracking area identity, geographical and/or geodetic information, a current RAT type, a local time zone, or any combination thereof.

Figure 11:
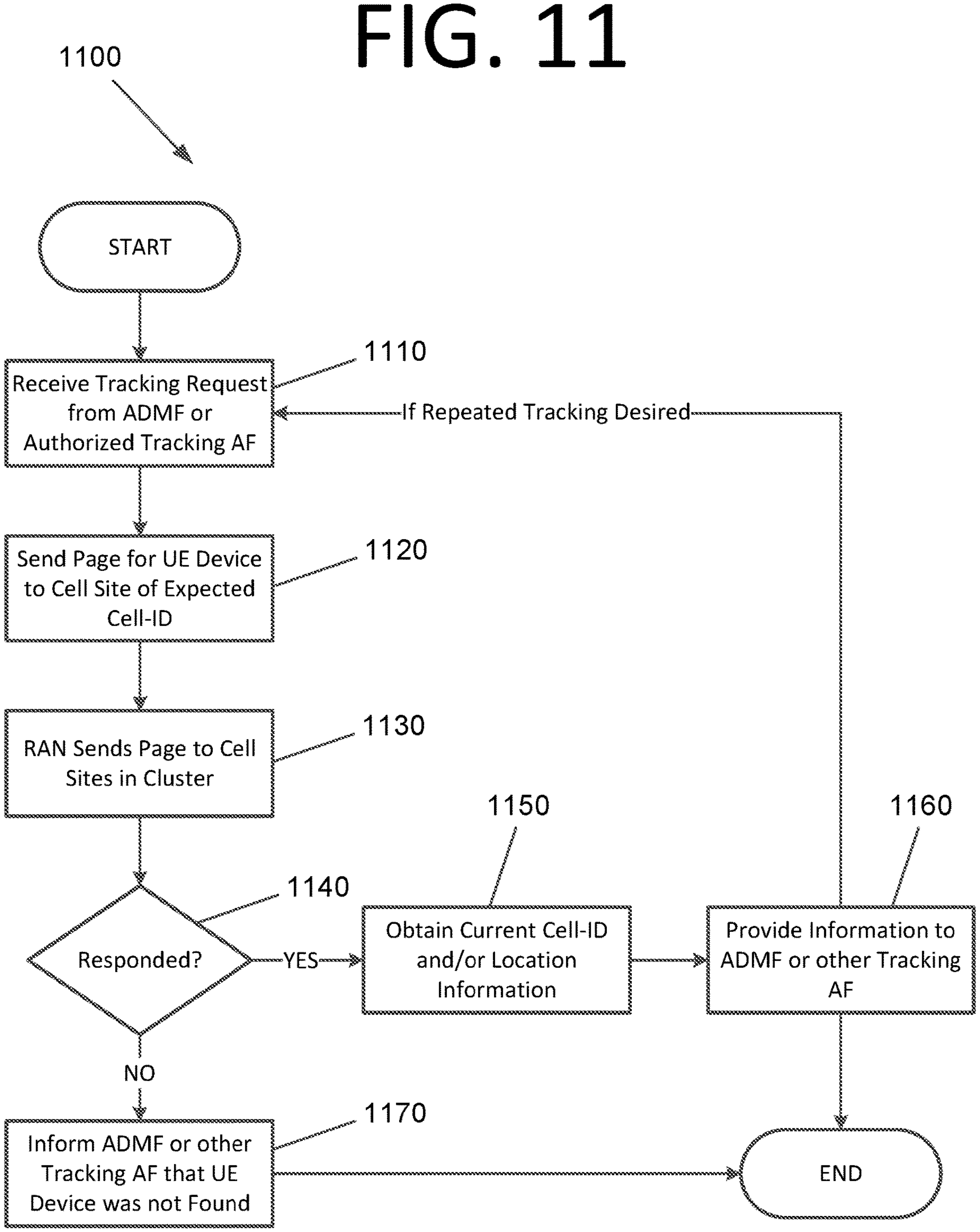
FIG. 11 is a flowchart illustrating a process for performing intelligent paging for UE devices in inactive mode, according to an embodiment of the present invention.

FIG. 11 is a flowchart illustrating a process 1100 for performing intelligent paging for UE devices in active mode, according to an embodiment of the present invention. Process 1100 is for 3GPP Rel-15 and Rel-16 architectures, for example. The process begins with an AMF receiving a request from an ADMF or authorized tracking AF to track a UE device at 1110. The AMF pages a cell site for the cell where the AMF expects the UE device to be located at 1120 since the AMF believes the UE device is actively connected to the network. The RAN knows which cluster that the UE device is in and sends the page to the cell sites of the cluster at 1130.

If the UE device responded at 1140, the base station and the UE device will have performed an RRC Setup procedure and the UE device will have transitioned to an active state. The transition of the UE device to active mode is performed without providing an indication to a user of the UE device that the transition occurred. The current Cell-ID (obtained by the AMF) and/or other location information (obtained via a GMLC and LMF) is obtained at 1150. This information is then provided to the ADMF or authorized tracking AF at 1160. The UE device then transitions back to an idle or inactive mode after the Cell-ID of the current cell that the UE device is in, the location information for the UE device, or both, is obtained. If repeated tracking is desired, the process is periodically repeated. However, if the UE device did not respond at 1140, the AMF informs the ADMF or authorized tracking AF at 1170 that the UE device was not found. The AMF may then seek the UE device by paging the Tracking Area in some embodiments.

It should be noted that while NFs such as an AMF, ADMF, UDM, GMLC, LMF, etc. are described throughout the application, the intelligent paging functionality described herein may be facilitated by other NFs for other network standards. For instance, the NF that manages access and mobility for UE devices could be a 4G Evolved Packet Core (EPC) Mobility Management Entity (MME), a 5G AMF, an NF that performs access and mobility management for 6G or beyond, etc. The NF that facilitates LI could be an ADMF in 5G or another LI NF for 4G or 6G and beyond. The NF that performs data management could be the Home Subscriber Service (HSS) in 4G or another data management NF for 6G and beyond.

The process steps performed in FIGS. 6A, 6B, 7, 10, and 11 may be performed by computer program(s), encoding instructions for the processor(s) to perform at least part of the process(es) described in FIGS. 6A, 6B, 7, 10, and 11 in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 910 of computing system 900 of FIG. 9) to implement all or part of the process steps described in FIGS. 6A, 6B, 7, 10, and 11, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more non-transitory computer-readable media storing one or more computer programs for performing paging for User Equipment (UE) devices in idle mode, the one or more computer programs configured to cause at least one processor to:

send, by a Network Function (NF) that facilitates Lawful Intercept (LI), a tracking request to an NF that manages access and mobility for UE devices;

responsive, by the NF that manages access and mobility for the UE devices, to receiving the tracking request, determine a Tracking Area in which a UE device is registered;

page, by the NF that manages access and mobility for the UE devices, cell sites of the Tracking Area to cause the UE device to transition from idle mode to active mode in direct response to a location tracking request, wherein the transition is performed without subsequently sending additional data pertaining to voice, text message, or data services for the UE device itself;

obtain, by the NF that manages access and mobility for the UE devices, a Cell Identifier (Cell-ID) of a current cell that the UE device is in; and provide, by the NF that manages access and mobility for the UE devices, the obtained Cell-ID to the NF that facilitates LI.

2. The one or more non-transitory computer-readable media of claim 1, wherein the one or more computer programs are configured to cause the at least one processor to:

responsive, by the NF that manages access and mobility for the UE devices, to a timestamp of a last known Cell-ID of the UE device being within a predetermined amount of time, page a base station associated with a cell site identified by the last known Cell-ID prior to paging other cell sites of the Tracking Area; and determine, by the NF that manages access and mobility for the UE devices, that the UE device did not respond to the page for the cell site associated with the last known Cell-ID.

3. The one or more non-transitory computer-readable media of claim 1, wherein the NF that facilitates LI is an Administrative Function (ADMF) in a first core network, the NF that manages access and mobility for the UE devices is an Access and Mobility Management Function (AMF) in a second core network, and the one or more computer programs are configured to cause the at least one processor to:

query, by the ADMF, a Unified Data Management (UDM) Network Function (NF) of the first core network for an AMF identifier (ID);

receive, by the ADMF, the AMF ID from the UDM NF;

determine, by the ADMF, that the AMF of the second core network is associated with the AMF ID; and perform, by the ADMF, the sending of the tracking request to the AMF using the AMF ID.

4. The one or more non-transitory computer-readable media of claim 1, wherein the NF that facilitates LI is an Administrative Function (ADMF), the NF that manages access and mobility for the UE devices is an Access and Mobility Management Function (AMF), and the one or more computer programs are configured to cause the at least one processor to:

send, by the ADMF, a Network Provided Location Information (NPLI) request message to the AMF after the UE device performs a Radio Resource Control (RRC) Setup procedure;

obtain, by a Gateway Mobile Location Center (GMLC), location information from the AMF and a Location Management Function (LMF); and send, by the GMLC, the obtained location information to the ADMF.

5. The one or more non-transitory computer-readable media of claim 4, wherein the obtaining of the location information comprises obtaining coordinates for the UE device using at least one of New Radio (NR) Enhanced Cell-ID (E-CID), Downlink (DL) Time Difference of Arrival (TDoA), Uplink (UL) TDoA, Multi-Cell Round Trip Time (MC-RTT), UL Angle of Arrival (AoA), and DL Angle of Departure (AoD).

6. The one or more non-transitory computer-readable media of claim 4, wherein the location information comprises at least one of a tracking area identity, geographical and/or geodetic information, a current Radio Access Technology (RAT) type, and a local time zone.

7. The one or more non-transitory computer-readable media of claim 1, wherein the paging of the cell sites of the Tracking Area comprises performing the paging without providing an indication to a user of the UE device that the transition occurred.

8. The one or more non-transitory computer-readable media of claim 1, wherein the one or more computer programs are configured to cause the at least one processor to:

periodically repeat, by the NF that manages access and mobility for the UE devices, the steps of claim 1 to provide tracking updates to the NF that facilitates LI.

9. The one or more non-transitory computer-readable media of claim 1, wherein the one or more computer programs are configured to cause the at least one processor to:

update, by the NF that manages access and mobility for the UE devices, an identifier of the Tracking Area after the UE device moves into a new Tracking Area.

10. One or more computing systems, comprising:

memory storing computer program instructions for performing paging for User Equipment (UE) devices in idle mode; and at least one processor configured to execute the computer program instructions, wherein the computer program instructions are configured to cause the at least one processor to:

determine, by a Network Function (NF) that manages access and mobility for UE devices, a Tracking Area in which a UE device is registered, page, by the NF that manages access and mobility for the UE devices, cell sites of the Tracking Area to cause the UE device to transition from idle mode to active mode in direct response to a location tracking request, wherein the transition is performed without subsequently sending additional data pertaining to voice, text message, or data services for the UE device itself, obtain, by the NF that manages access and mobility for the UE devices, a Cell Identifier (Cell-ID) of a current cell that the UE device is in, and provide, by the NF that manages access and mobility for the UE devices, the obtained Cell-ID to an NF that facilitates Lawful Intercept (LI), by the NF that manages access and mobility for the UE devices.

11. The one or more computing systems of claim 10, wherein the computer program instructions are configured to cause the at least one processor to:

responsive, by the NF that manages access and mobility for the UE devices, to a timestamp of a last known Cell-ID of the UE device being within a predetermined amount of time, page a base station associated with a cell site identified by the last known Cell-ID prior to paging other cell sites of the Tracking Area; and determine, by the NF that manages access and mobility for the UE devices, that the UE device did not respond to the page for the cell site associated with the last known Cell-ID.

12. The one or more computing systems of claim 10, wherein the NF that facilitates LI is an Administrative Function (ADMF) in a first core network, the NF that manages access and mobility for the UE devices is an Access and Mobility Management Function (AMF) in a second core network, and the computer program instructions are configured to cause the at least one processor to:

query, by the ADMF, a Unified Data Management (UDM) Network Function (NF) of the first core network for an AMF identifier (ID);

receive, by the ADMF, the AMF ID from the UDM NF;

determine, by the ADMF, that the AMF of the second core network is associated with the AMF ID; and perform, by the ADMF, the sending of the tracking request to the AMF using the AMF ID.

13. The one or more computing systems of claim 10, wherein the NF that facilitates LI is an Administrative Function (ADMF), the NF that manages access and mobility for the UE devices is an Access and Mobility Management Function (AMF), and the computer program instructions are configured to cause the at least one processor to:

send, by the ADMF, a Network Provided Location Information (NPLI) request message to the AMF after the UE device performs a Radio Resource Control (RRC) Setup procedure;

obtain, by a Gateway Mobile Location Center (GMLC), location information from the AMF and a Location Management Function (LMF); and send, by the GMLC, the obtained location information to the ADMF.

14. The one or more computing systems of claim 13, wherein the location information comprises at least one of a tracking area identity, geographical and/or geodetic information, a current Radio Access Technology (RAT) type, and a local time zone.

15. The one or more computing systems of claim 10, wherein the paging of the cell sites of the Tracking Area comprises performing the paging without providing an indication to a user of the UE device that the transition occurred.

16. The one or more computing systems of claim 10, wherein the computer program instructions are configured to cause the at least one processor to:

periodically repeat, by the NF that manages access and mobility for the UE devices, the steps of claim 10 to provide tracking updates to the NF that facilitates LI.

17. A computer-implemented method for performing paging for User Equipment (UE) devices in idle mode, comprising:

querying, by a Network Function (NF) that facilitates Lawful Intercept (LI), an NF that performs data management for a telecommunications network for an identifier of an NF that manages access and mobility for UE devices for a UE device;

receiving, by the NF that facilitates LI, the identifier of the NF that manages access and mobility for the UE devices from the NF that performs data management for the telecommunications network;

sending, by the NF that facilitates LI, a tracking request to the NF that manages access and mobility for the UE devices associated with the identifier;

responsive, by the NF that manages access and mobility for the UE devices, to receiving the tracking request from the NF that facilitates LI, determining a Tracking Area in which a UE device is registered;

paging, by the NF that manages access and mobility for the UE devices, cell sites of the Tracking Area to cause the UE device to transition from idle mode to active mode in direct response to a location tracking request, wherein the transition is performed without subsequently sending additional data pertaining to voice, text message, or data services for the UE device itself;

obtaining, by the NF that manages access and mobility for the UE devices, a Cell Identifier (Cell-ID) of a current cell that the UE device is in; and providing, by the NF that manages access and mobility for the UE devices, the obtained Cell-ID to the NF that facilitates LI.

18. The computer-implemented method of claim 17, the NF that facilitates LI is an Administrative Function (ADMF), the NF that manages access and mobility for the UE devices is an Access and Mobility Management Function (AMF), and the method further comprises:

sending, by the ADMF, a Network Provided Location Information (NPLI) request message to the AMF after the UE device performs a Radio Resource Control (RRC) Setup procedure;

obtaining, by a Gateway Mobile Location Center (GMLC), location information from the AMF and a Location Management Function (LMF); and sending, by the GMLC, the obtained location information to the ADMF.

19. The computer-implemented method of claim 18, wherein the obtaining of the location information comprises obtaining coordinates for the UE device using at least one of New Radio (NR) Enhanced Cell-ID (E-CID), Downlink (DL) Time Difference of Arrival (TDoA), Uplink (UL) TDoA, Multi-Cell Round Trip Time (MC-RTT), UL Angle of Arrival (AoA), and DL Angle of Departure (AoD).

20. The computer-implemented method of claim 17, wherein paging of the cell sites of the Tracking Area comprises performing the paging without providing an indication to a user of the UE device that the transition occurred.

* * * * *